United States Patent
Yoshida

(10) Patent No.: US 9,208,416 B2
(45) Date of Patent: Dec. 8, 2015

(54) IMAGE PROCESSING APPARATUS PERFORMING HALFTONE PROCESS ON IMAGE DATA BASED ON A CORRECTED TONE VALUE AND AN ERROR VALUE OF TARGET PIXELS

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/317,243

(22) Filed: Jun. 27, 2014

(65) Prior Publication Data
US 2015/0002905 A1    Jan. 1, 2015

(30) Foreign Application Priority Data
Jun. 28, 2013   (JP) ................. 2013-135901

(51) Int. Cl.
*H04N 1/405* (2006.01)
*G06K 15/02* (2006.01)
*H04N 1/58* (2006.01)

(52) U.S. Cl.
CPC .......... *G06K 15/1881* (2013.01); *H04N 1/4057* (2013.01); *H04N 1/58* (2013.01)

(58) Field of Classification Search
None
See application file for complete search history.

(56) References Cited

U.S. PATENT DOCUMENTS

| | | | | |
|---|---|---|---|---|
| 5,999,704 A | * | 12/1999 | Hirao | 358/2.1 |
| 2006/0221398 A1 | * | 10/2006 | Yokochi | 358/3.03 |
| 2008/0199792 A1 | | 8/2008 | Kawasaki et al. | |

FOREIGN PATENT DOCUMENTS

| | | |
|---|---|---|
| JP | 9-277604 A | 10/1997 |
| JP | 10-157205 A | 6/1998 |
| JP | 2002-292929 A | 10/2002 |
| JP | 2008-49694 A | 3/2008 |

* cited by examiner

*Primary Examiner* — Mohammad Ghayour
*Assistant Examiner* — Christopher D Wait
(74) *Attorney, Agent, or Firm* — Merchant & Gould PC

(57) ABSTRACT

The present invention provides an image processing apparatus that includes a processor. The processor is configured to calculate a corrected tone value of a target pixel using a tone value of the target pixel and an error value of a previously processed pixel; determine a dot value of the target pixel by comparing the corrected tone value with a threshold value; calculate an error value of the target pixel using the corrected tone value and a first density value when the dot value indicates to form a dot and the dot to be formed is a first dot formed in isolation; and calculate an error value of the target pixel using the corrected tone value and a second density value when the dot value indicates to form a dot and the dot to be formed is a second dot formed at a particular location in consecutive dots.

17 Claims, 15 Drawing Sheets

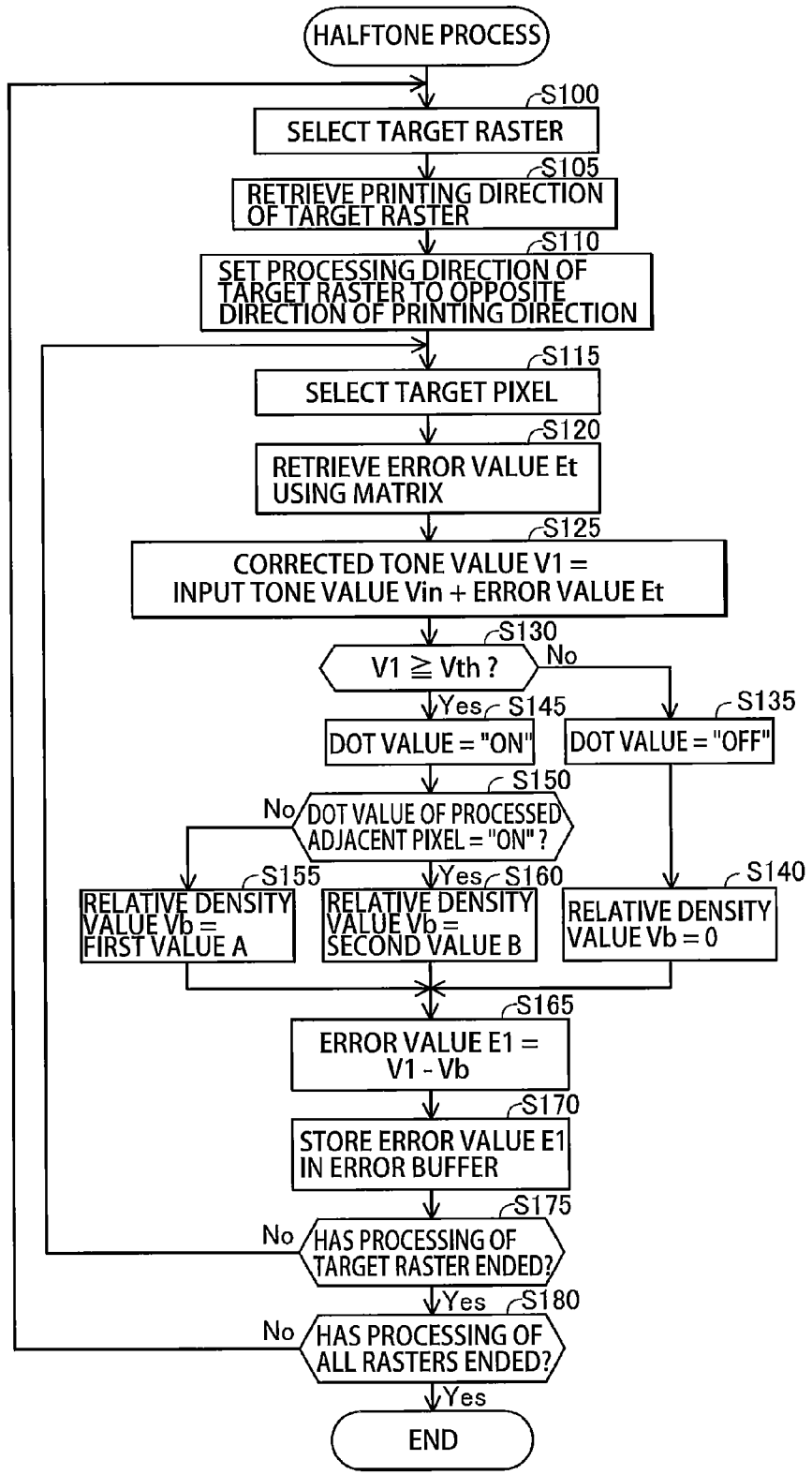

FIG. 9A
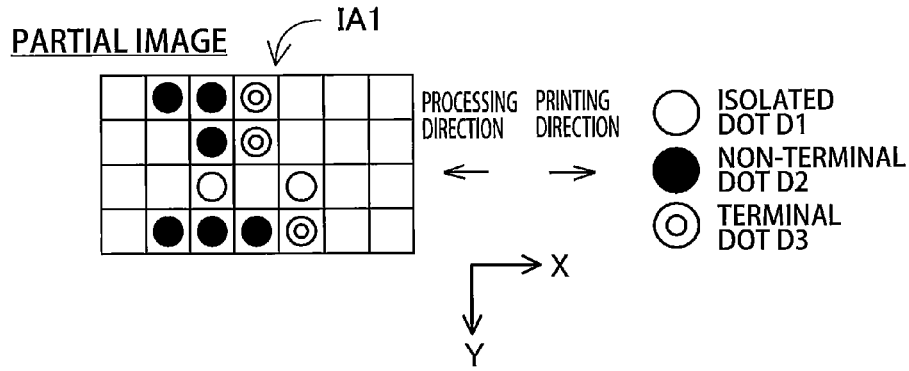
FIG. 9B
RELATIVE DENSITY VALUE Vb
FIG. 9C
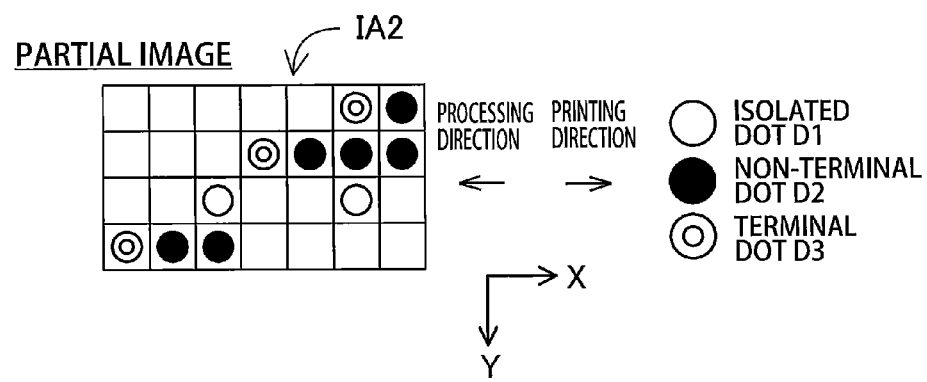
FIG. 9D
RELATIVE DENSITY VALUE Vb

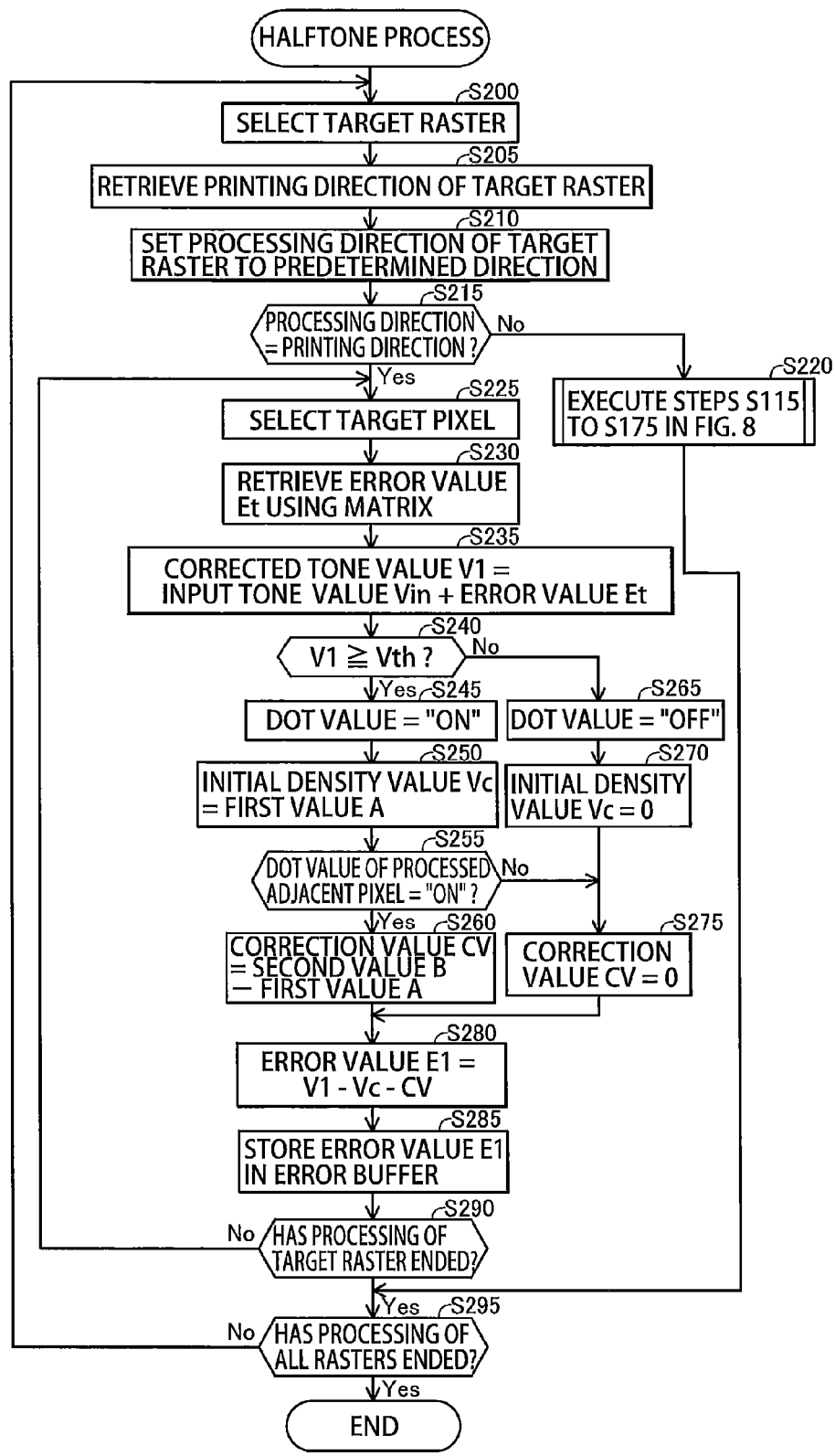

FIG. 12A
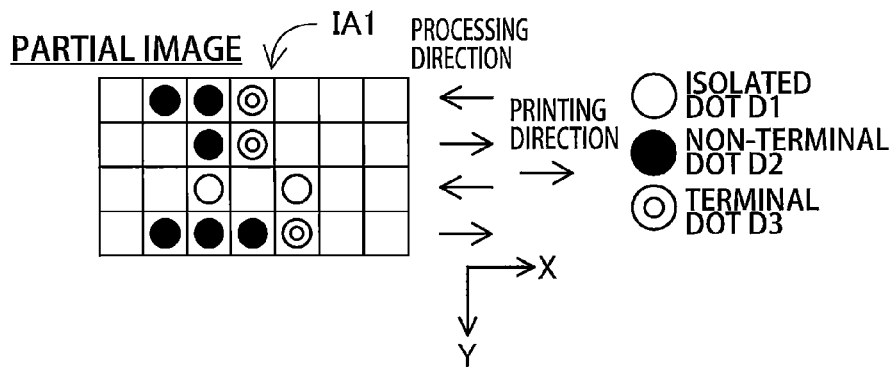
FIG. 12B
RELATIVE DENSITY VALUE Vb
FIG. 12C
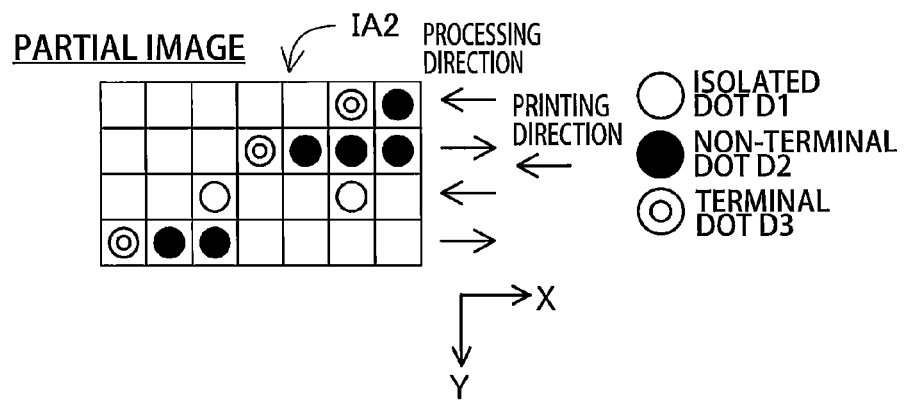
FIG. 12D
RELATIVE DENSITY VALUE Vb

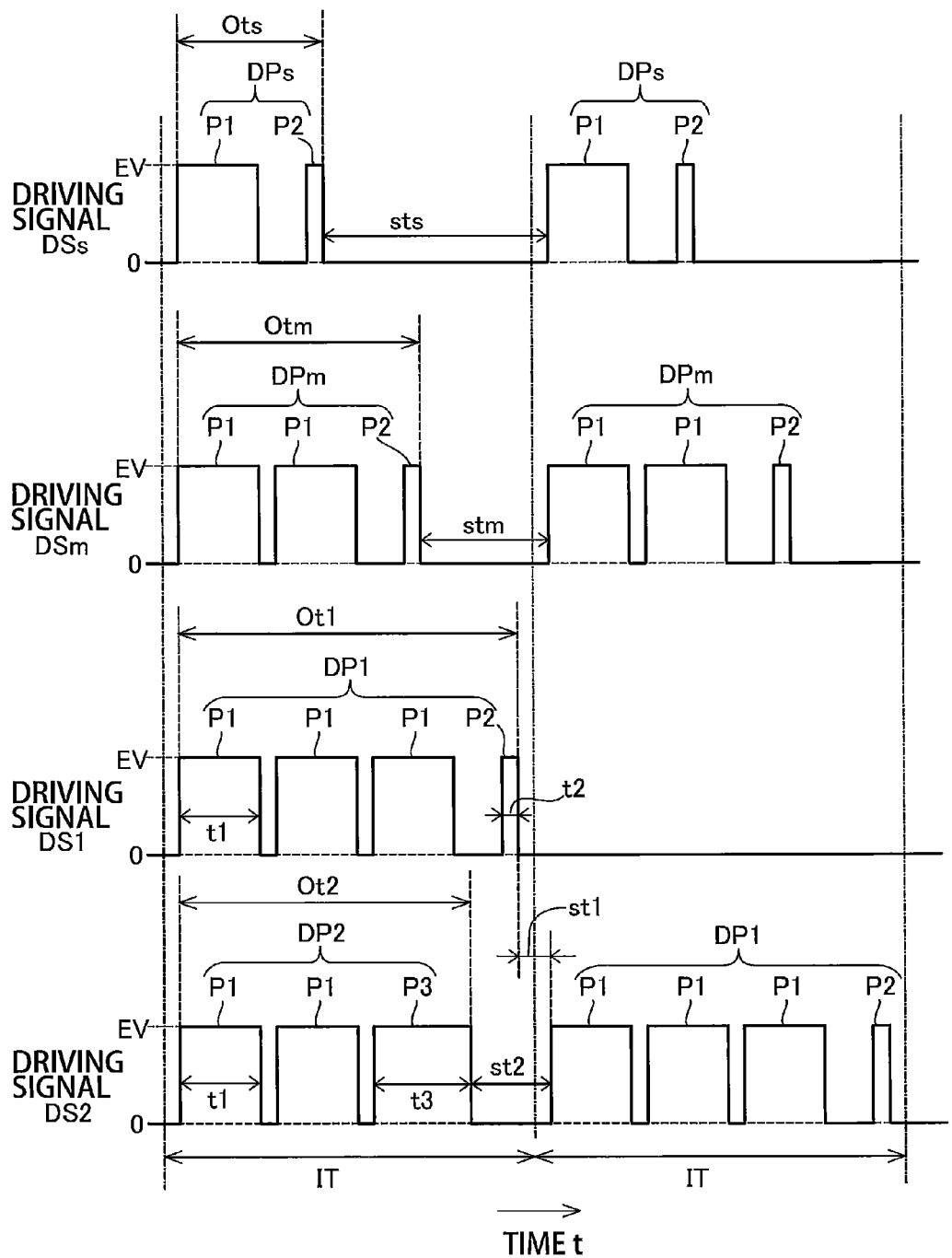

RELATIVE DENSITY VALUE Vb

RELATIVE DENSITY VALUE Vb

IMAGE PROCESSING APPARATUS PERFORMING HALFTONE PROCESS ON IMAGE DATA BASED ON A CORRECTED TONE VALUE AND AN ERROR VALUE OF TARGET PIXELS

CROSS REFERENCE TO RELATED APPLICATION

This application claims priority from Japanese Patent Application No. 2013-135901 filed Jun. 28, 2013. The entire content of the priority application is incorporated herein by reference.

TECHNICAL FIELD

The present invention relates to image processing for printing, and in particular relates to processing in which a dot value is set for each pixel to indicate dot formation status.

BACKGROUND

In printing performed by a printer, dots of coloring material such as ink and toner are formed. For printers of this type, technologies have been proposed to control driving signals for forming individual dots based on dot formation conditions of neighboring dots. For example, technology is disclosed in which different driving signals are utilized depending on whether a dot to be formed is an isolated dot or a consecutive dot (see Japanese Patent Application No. H09-277604, Japanese Patent Application No. 2002-292929, Japanese Patent Application No. 2008-49694, and Japanese Patent Application No. H10-157205, for example). Specifically, by performing control such that a pulse width of a driving signal when forming isolated dots is made wider than the pulse width of the driving signal when forming consecutive dots, isolated dots is made wider than the pulse width of the driving signal when forming consecutive dots, isolated dots can be reliably formed on a recording sheet.

SUMMARY

However, with the above-described technologies, the fact, as a result of the driving signals being different from each other, densities expressed by formed dots may be different from each other, was not taken into consideration. For this reason, print images may not be expressed with appropriate densities.

In view of the foregoing, it is an object of the present invention to provide a new technology capable of expressing print image densities appropriately.

In order to attain the above and other objects, the present invention provides an image processing apparatus that may include a processor. The processor may be configured to: perform a halftone process on image data to generate processed image data, the image data including a plurality of tone values of a plurality of pixels, the processed image data including a plurality of dot values of the plurality of pixels, each of the plurality of dot values indicating dot formation status; and supply the processed image data to a printing execution unit. To perform the halftone process, the processor may be further configured to: calculate a corrected tone value of a target pixel using a tone value of the target pixel and an error value of a previously processed pixel; determine a dot value of the target pixel by comparing the corrected tone value of the target pixel with a threshold value; calculate an error value of the target pixel using the corrected tone value of the target pixel and a first density value when the dot value of the target pixel indicates to form a dot and the dot to be formed corresponding to the dot value of the target pixel is a first dot, the first dot being an isolated dot.

According to another aspect, the present invention provides a non-transitory computer readable storage medium storing a set of program instructions executed by a processor. The set of program instructions may include: performing a halftone process on image data to generate processed image data, the image data including a plurality of tone values of a plurality of pixels, the processed image data including a plurality of dot values of the plurality of pixels, each of the plurality of dot values indicating dot formation status; and supplying the processed image data to the printing execution unit. The performing of the halftone process includes: calculating a corrected tone value of a target pixel using a tone value of the target pixel and an error value of a previously processed pixel; determining a dot value of the target pixel by comparing the corrected tone value of the target pixel and a threshold value; calculating an error value of the target pixel using the corrected tone value of the target pixel and a first density value when the dot value of the target pixel indicates to form a dot and a dot to be formed corresponding to the dot value of the target pixel is a first dot, the first dot being an isolated dot; and calculating an error value of the target pixel using the corrected tone value of the target pixel and a second density value when the dot value of the target pixel indicates to form a dot and a dot to be formed corresponding to the dot value of the target pixel is a second dot, the second dot being a dot to be formed at a particular location in consecutive dots.

According to still another aspect, the present invention provides a method. The method may include: performing a halftone process on image data to generate processed image data, the image data including a plurality of tone values of a plurality of pixels, the processed image data including a plurality of dot values of the plurality of pixels, each of the plurality of dot values indicating dot formation status; and supplying the processed image data to the printing execution unit. The performing of the halftone process may include: calculating a corrected tone value of a target pixel using a tone value of the target pixel and an error value of a previously processed pixel; determining a dot value of the target pixel by comparing the corrected tone value of the target pixel with a threshold value; calculating an error value of the target pixel using the corrected tone value of the target pixel and a first density value when the dot value of the target pixel indicates to form a dot and a dot to be formed corresponding to the dot value of the target pixel is a first dot, the first dot being an isolated dot; and calculating an error value of the target pixel using the corrected tone value of the target pixel and a second density value when the dot value of the target pixel indicates to form a dot and a dot to be formed corresponding to the dot value of the target pixel is a second dot, the second dot being a dot to be formed at a particular location in consecutive dots.

In addition, the present invention can be implemented in a variety of forms, for example as a printing device equipped with the above-described image processing apparatus and the above-described printing execution unit, as a computer program that implements the functions of these devices or the methods described above, or as a recording medium on which this computer program has been recorded.

BRIEF DESCRIPTION OF THE DRAWINGS

The particular features and advantages of the invention as well as other objects will become apparent from the following description taken in connection with the accompanying drawings, in which:

FIG. 8 is a flowchart illustrating steps in a halftone process according to the first embodiment;

FIG. 9A is an explanatory diagram showing an example of the print image for the first embodiment;

FIG. 9B is an explanatory diagram showing an example of the print image for the first embodiment;

FIG. 9C is an explanatory diagram showing an example of the print image for the first embodiment;

FIG. 9D is an explanatory diagram showing an example of the print image for the first embodiment;

FIG. 10 is a flowchart illustrating steps in a halftone process according to a second embodiment;

FIG. 12A is an explanatory diagram showing an example of a print image for the second embodiment;

FIG. 12B is an explanatory diagram showing an example of the print image for the second embodiment;

FIG. 12C is an explanatory diagram showing an example of the print image for the second embodiment;

FIG. 12D is an explanatory diagram showing an example of the print image for the second embodiment;

FIG. 13 is an explanatory diagram showing examples of driving signals DS in a third embodiment;

DETAILED DESCRIPTION

A. First Embodiment

A-1. Configuration of Printing System

Figure 1:
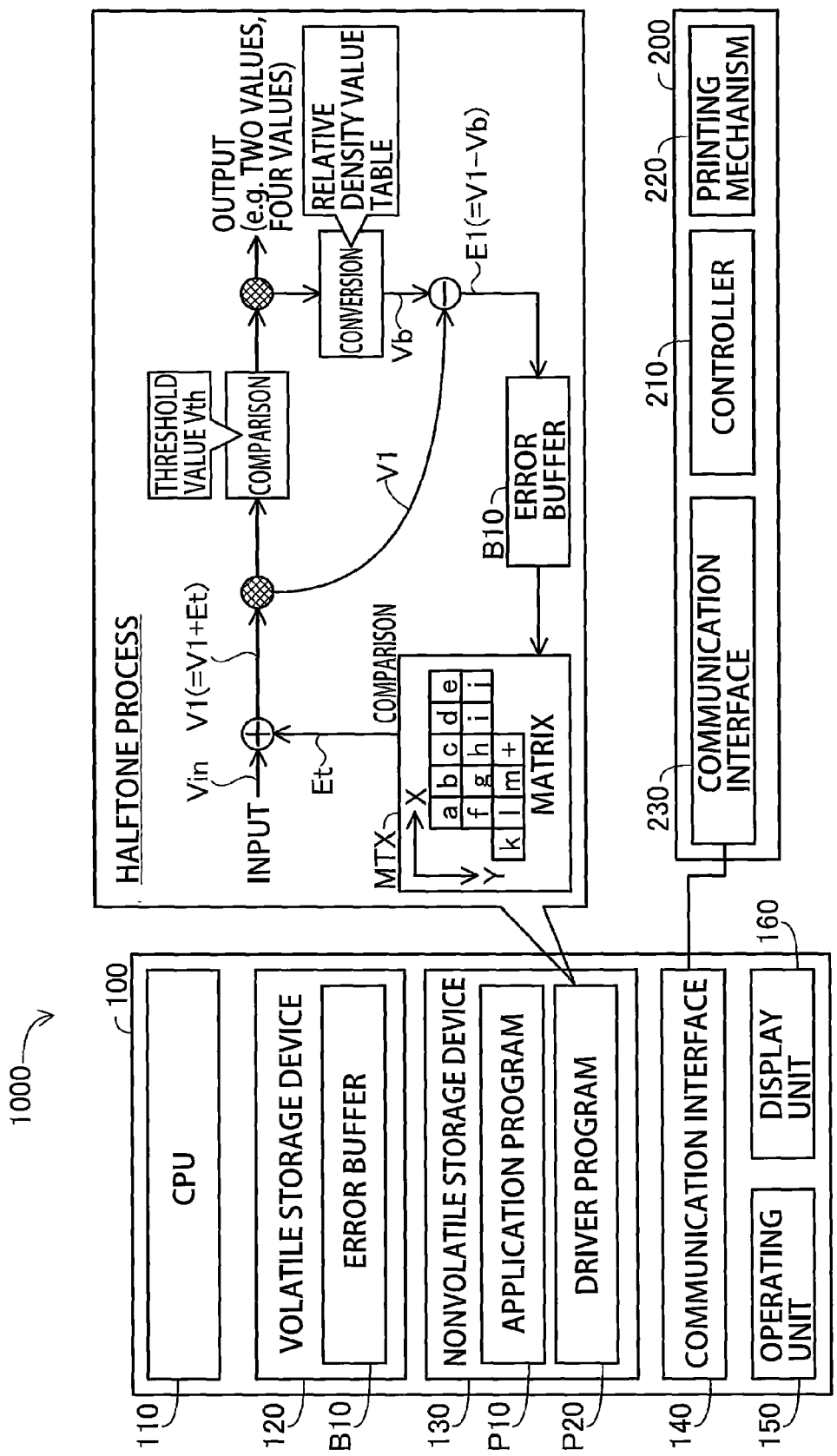
FIG. 1 is a block diagram showing the configuration of a printing system 1000 according to the preferred embodiment.

Next, an implementation of the present invention will be described according to embodiments while referring to the accompanying drawings wherein like parts and components are designated by the same reference numerals to avoid duplication description. FIG. 1 is a block diagram showing the configuration of a printing system 1000 according to the preferred embodiment. The printing system 1000 includes a personal computer 100 and a printer 200.

The personal computer 100 includes a CPU 110, a volatile storage device 120 such as DRAM, a nonvolatile storage device 130 such as a hard disk drive, a communication interface 140 for communication with external devices such as the printer 200, an operating unit 150 that includes for instance a mouse and a keyboard, and a display unit 160 such as a liquid crystal display. An error buffer B10, described later, is provided in the nonvolatile storage device 120.

An application program P10 and a driver program P20 are stored in the nonvolatile storage device 130. The application program P10 implements functionality to generate image data for, for example, text creation and image generation. The driver program P20 implements printer driver functionality. The respective programs P10 and P20 can for example be provided stored on a DVD-ROM. The functionality of the respective programs P10 and P20 is achieved by having the CPU 110 execute the programs. The printer driver functionality includes functionality to generate image data by executing image processing such as a halftone process (error diffusion process), described later, and supplying this image data to the printer 200. In addition, in FIG. 1, an overview of the present embodiment is also shown. A detailed description is presented later.

The printer 200 is an inkjet printer that prints by forming ink dots on a sheet of paper. The printer 200 includes a controller 210 that controls the printer 200 as a whole, a printing mechanism 220 that performs printing, and a communication interface 230 for communicating with external devices such as the personal computer 100 and storage devices (for example, USB memory, not shown). In the memory of the controller 210, various programs (not shown) for controlling the printer 200 are stored. The controller 210 controls the printing mechanism 220 in accordance with printing data received from the communication interface 230, and printing is thereby carried out.

Figure 2:
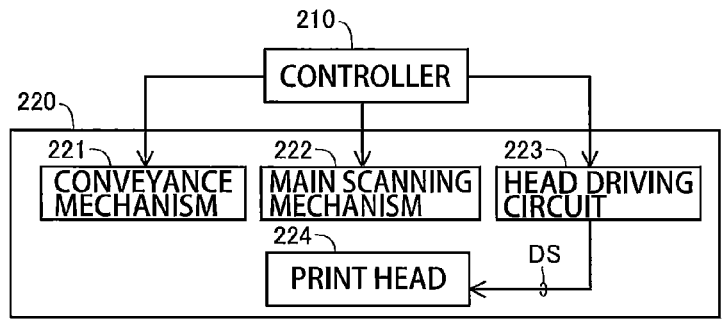
FIG. 2 is a schematic view showing the configuration of a printing mechanism 220.

FIG. 2 shows a schematic view of the configuration of the printing mechanism 220. The printing mechanism 220, in response to control executed by the controller 210, is capable of performing color printing by ejecting cyan (C), magenta (M), yellow (Y) and black (K) inks, and is capable of performing monochrome printing by ejecting black ink. The printing mechanism 220 includes a conveyance mechanism 221, a main scanning mechanism 222, a head driving circuit 223, and a print head 224. The conveyance mechanism 221 includes a conveyance motor (not shown), and utilizes motive power of the conveyance motor to convey the sheet of paper in a conveyance direction (also called a sub-scanning direction). The main scanning mechanism 222 includes a main scanning motor (not shown), and utilizes motive power of the main scanning motor to reciprocatingly move (perform main scanning of) the print head 224 in a main scanning direction. While the main scanning mechanism 222 is performing main scanning of the print head 224, the head driving circuit 223 drives the print head 224 by supplying a driving signal DS to the print head 224. The print head 224, in accordance with the driving signals DS, ejects ink to form dots on the sheet of paper being conveyed by the conveyance mechanism 221.

Figure 3A:
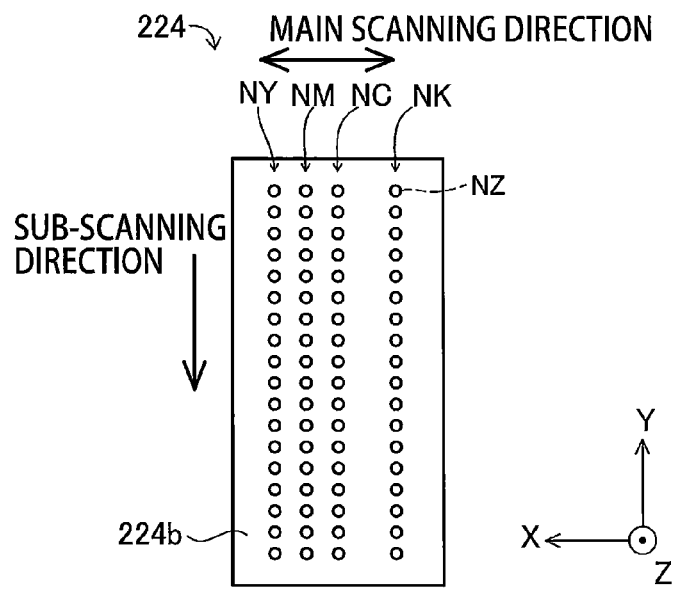
FIG. 3A is a schematic view showing the configuration of a print head 224.
Figure 3B:
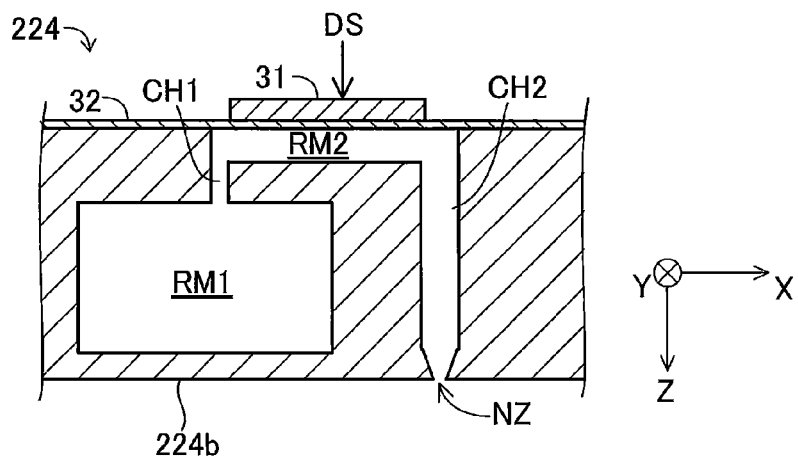
FIG. 3B is a schematic view showing the configuration of a print head 224.

FIGS. 3A and 3B show a schematic view of the configuration of the print head 224. As shown in FIG. 3A, the print head 224 has a bottom surface 224*b* (a surface in a +Z direction in FIG. 3A), i.e. a surface that opposes the sheet of paper during printing. On the bottom surface 224*b* are formed multiple nozzle arrays, each composed of multiple nozzles; namely, nozzle arrays NC, NM, NY, and NK that respectively eject the above-described C, M, Y, and K ink. Each nozzle array includes multiple nozzles NZ at differing locations in the sub-scanning direction (the −Y direction in FIG. 3). Incidentally, the +X direction and −X direction in FIGS. 3A and 3B indicate the main scanning direction.

FIG. 3B is a schematic cross-sectional view showing an ink ejection mechanism in the print head 224. In FIG. 3B, a schematic view of the configuration of only one nozzle NZ is shown in order to avoid complexity. The print head 224 has an ink chamber RM1 provided for each ink, a pressure chamber RM2 provided for each nozzle NZ, a first channel CH1, and a second channel CH2. Each ink chamber RM1 is supplied with ink from an ink cartridge (not shown), and stored this ink. Each ink chamber RM1 is in communication with the corresponding pressure chamber RM2 through the corresponding first channel CH1. Ink stored in the ink chamber RM1 flows through the first channel CH1 and into the pressure chamber RM2. An upstream end of the second channel CH2 is in communication with the pressure chamber RM2. A downstream end of the second channel CH2 forms an opening on the bottom surface 224*b* of the print head 224 to constitute the nozzle NZ.

A ceiling surface of the pressure chamber RM2 is configured with a vibrating plate 32. The vibrating plate 32 has an upper surface at which a piezoelectric element 31 is disposed. This piezoelectric element 31 vibrates in accordance with the driving signal DS supplied from the head driving circuit 223 (FIG. 2). In accordance with the vibration of the piezoelectric element 31, the vibrating plate 32 vibrates, and in accordance with the vibration of the vibrating plate 32, volume of the pressure chamber RM2 varies.

In accordance with the variation in the volume of the pressure chamber RM2, ink is ejected from the nozzle NZ. Specifically, when the volume of the pressure chamber RM2 increases, ink flows out of the ink chamber RM1, through the first channel CH1, and into the pressure chamber RM2. Further, when the volume of the pressure chamber RM2 decreases, ink in the pressure chamber RM2 flows through the second channel CH2 and is ejected from the nozzle NZ.

As can be ascertained from the explanation above, dots of an appropriate size can be formed at appropriate locations on the sheet of paper by having the head driving circuit 223 supply, with appropriate timing, a driving signal DS having an appropriate waveform to the piezoelectric element 31 corresponding to the nozzle NZ from which ink is to be ejected.

Figure 4:
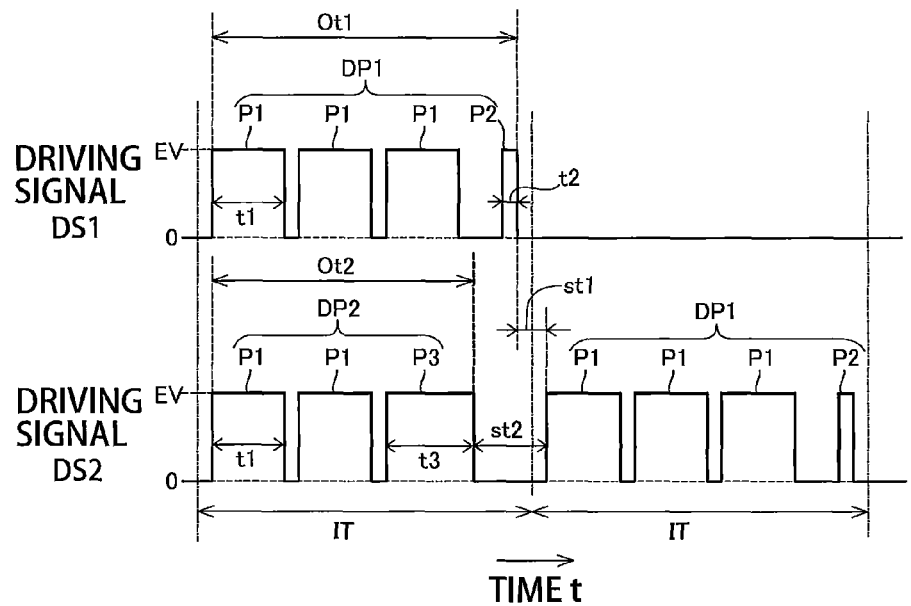
FIG. 4 is an explanatory diagram showing examples of driving signals DS in the first embodiment.

FIG. 4 shows examples of driving signals DS in the first embodiment. A driving signal DS includes one unit signal for each dot to be formed. In other words, a driving signal DS for forming N dots includes N unit signals (where N is a natural number). In the present embodiment, two types of unit signals are utilized; specifically, a first unit signal DP1 and a second unit signal DP2. For example, a driving signal DS1 shown in FIG. 4 includes one first unit signal DP1. A driving signal DS2 includes one first unit signal DP1 and one second unit signal DP2. These unit signals DP1 and DP2 are outputted within a specific period IT. This specific period IT is set so as to allow dots to be formed at desired locations on the sheet of paper, based on a speed at which the print head 224 moves in the main scanning direction during printing.

The first unit signal DP1 includes three first pulses P1, and one second pulse P2 outputted after the three first pulses P1. The first pulse P1 is a substantially rectangular pulse having an output voltage which is held at a voltage EV for a time period t1. The second pulse P2 is a substantially rectangular pulse having an output voltage which is held at the voltage EV for a time period t2 which is shorter than the time period t1. The first pulse P1 is for varying the volume of the pressure chamber RM2 and thereby ejecting ink. The second pulse P2 is for suppressing the variation in volume of the pressure chamber RM2 and thereby stabilizing the amount of ink ejected.

The second unit signal DP2 includes two first pulses P1, and one third pulse P3 outputted after the two first pulses P1. The third pulse P3 is a substantially rectangular pulse having an output voltage which is held at a voltage EV for a time period t3 which is longer than the time period t1. Differentiation in the use of the two respective unit signals DP1 and DP2 is explained later.

A-2. Printing System Operation

In the printing system 1000 of the present embodiment, the personal computer 100 and the printer 200 collaborate to accomplish printing. In other words, the personal computer 100 executes image processing in order to generate image data, and the printer 200 executes a print process using the printing data generated by the image processing.

Figure 5:
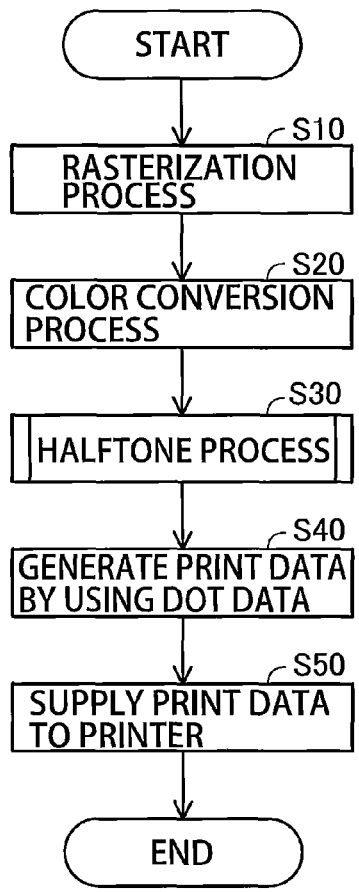
FIG. 5 is a flowchart illustrating steps in image processing according to the preferred embodiment.

A-2-1. Image Processing Overview:

FIG. 5 is a flowchart illustrating steps in image processing executed by the personal computer 100. The CPU 110 of the personal computer 100 (FIG. 1) executes this image processing upon receiving printing instructions from a user. This image processing is implemented as functionality of the printer driver. In other words, this image processing is implemented as a result of the CPU 110 executing the driver program P20 (FIG. 1).

In an initial step S10, the CPU 110 retrieves the image data to be printed, and converts the retrieved image data into bitmap data (rasterization process). The image data to be printed is image data which has for example been specified by the user, and which has for example been created by functionality implemented by the application program P10. The bitmap data is for example RGB image data, which represents the color of each pixel using tone values (e.g. 256 tones) for three components; namely, R, G, and B.

In step S20, the CPU 110 performs a color conversion process, converting the RGB image data into CMYK image data, which represents pixel colors using tone values (e.g. 256 tones, from 0 to 255) for four components; namely, cyan, magenta, yellow, and black. The color conversion process is performed using a lookup table which associates RGB image data and CMYK image data.

In step S30, the CPU 110 performs a halftone process, converting the CMYK image data into dot data, which represents dot formation status for each pixel as well as for each ink color. Each respective pixel value contained in the dot data is either a value indicating that a dot is to be formed, or a value indicating that a dot is not to be formed. In other words, the dot data in the present embodiment is two-value data, and one type of dot is represented by this dot data. Pixel values in the dot data are also called dot values. Details regarding the halftone process are described later.

In step S40, the CPU 110 uses the dot data to generate printing data. For example, the CPU 110 arranges the dot values contained in the dot data in an order that is utilized when the printing mechanism 220 of the printer 200 carries out printing, and appends printer control codes and identifier codes to the dot data. As a result, printing data which can be interpreted by the printer 200 is generated.

In a final step S50, the CPU 110 supplies the generated printing data to the printer 200 via the communication interface 140.

Figure 6:
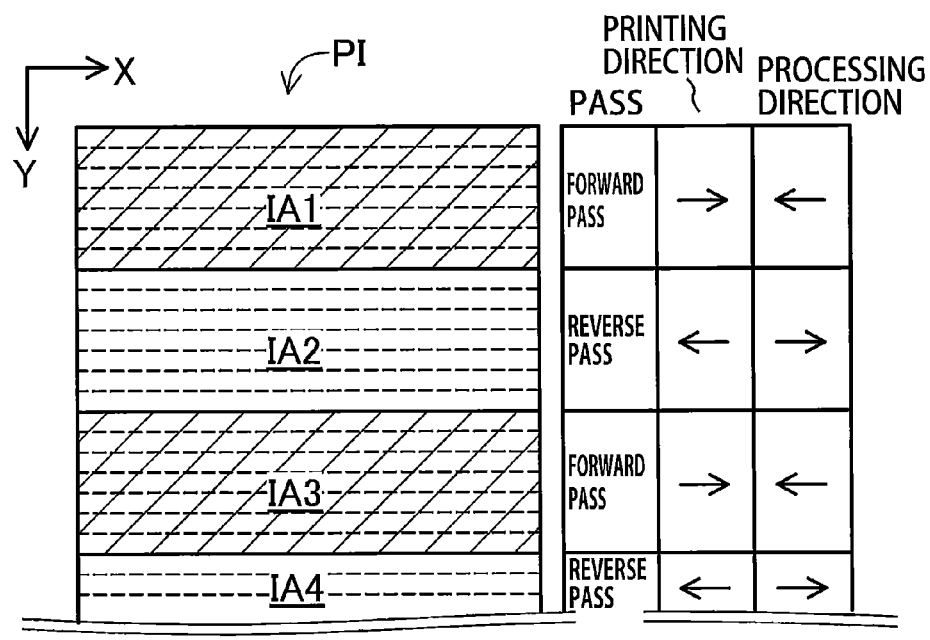
FIG. 6 is an explanatory view of a print process according to a first embodiment.

A-2-2. Print Process Overview:

FIG. 6 is an explanatory view of a print process. In FIG. 6, a print image PI is printed by the printer 200. Upon receiving, via the communication interface 230, the print data generated by the image processing described above, the controller 210 of the printer 200 carries out printing by using the printing data to control the printing mechanism 220 (FIG. 2). Specifically, the controller 210 of the printer 200 prints the print image PI by repeatedly alternating between unit printing and unit sub-scanning.

Unit printing is printing carried out by ejecting ink from the nozzles NZ formed on the print head 224 while performing a single main scan, with the sheet of paper held stationary. A single main scan corresponding to a single instance of unit printing is also called a pass. In a single instance of unit printing, the controller 210 is capable of printing while performing a main scan in a forward direction (called a forward pass) and of printing while performing scan in a reverse direction (called a reverse pass). In other words, there are two main scanning directions, i.e. the forward direction and the reverse direction, with the forward direction being the +X direction in FIG. 6, and the reverse direction being the −X direction in FIG. 6. In the present embodiment, the forward pass and the reverse pass are performed alternately.

Unit sub-scanning is sub-scanning, i.e. conveying the sheet of paper, by a prescribed feed distance. The −Y direction in FIG. 6 is the sub-scanning direction (conveyance direction of the sheet of paper). In the present embodiment, the prescribed feed distance utilized for printing is substantially equal to a distance, in the sub-scanning direction, between a most upstream nozzle NZ and a most downstream nozzle NZ in a single nozzle array (for example the nozzle array NK for black ink (FIG. 3A)).

FIG. 6 shows four partial images IA1 to IA4 contained in the print image PI. Each of the partial images IA1 to IA4 is printed in a single instance of unit printing. As shown in FIG. 6, the two partial images IA1 and IA3 are printed during forward passes, and the two partial images IA2 and IA4 are printed during reverse passes.

Here, the respective directions of the unit printing passes (the forward direction and the reverse direction) are called printing directions (FIG. 6). The printing direction is an example of a forming direction. In unit printing, dots formed by a single nozzle NZ, i.e. dots arrayed in the main scanning direction, are formed sequentially from the upstream side to the downstream side in the pass direction. As a result, the printing direction indicates the order in which dots arrayed in the main scanning direction in the print image are formed. For this reason, the printing direction is also called the formation direction.

Figure 7A:
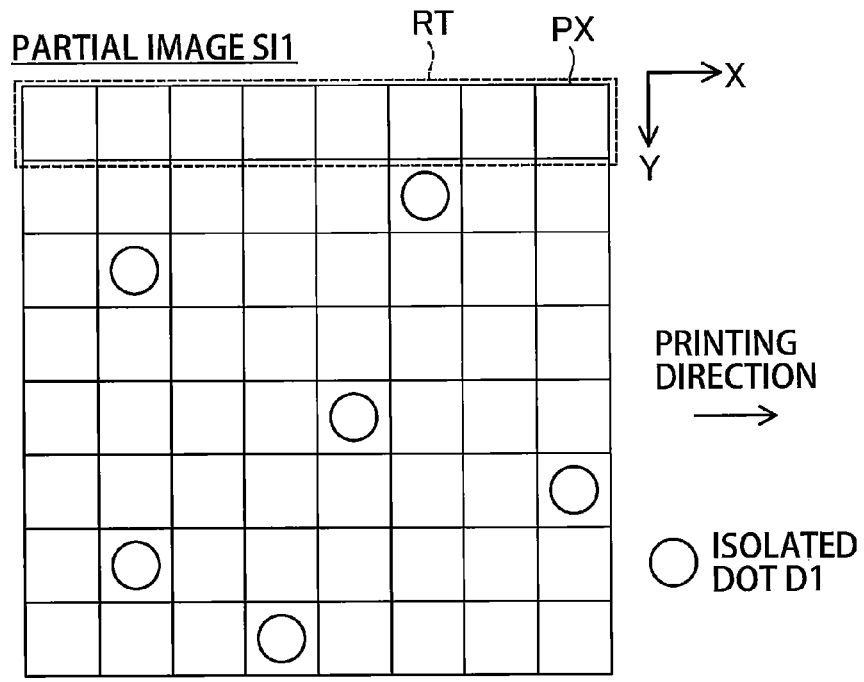
FIG. 7A is an explanatory diagram showing an example of a dot formation pattern within a print image PI.
Figure 7B:
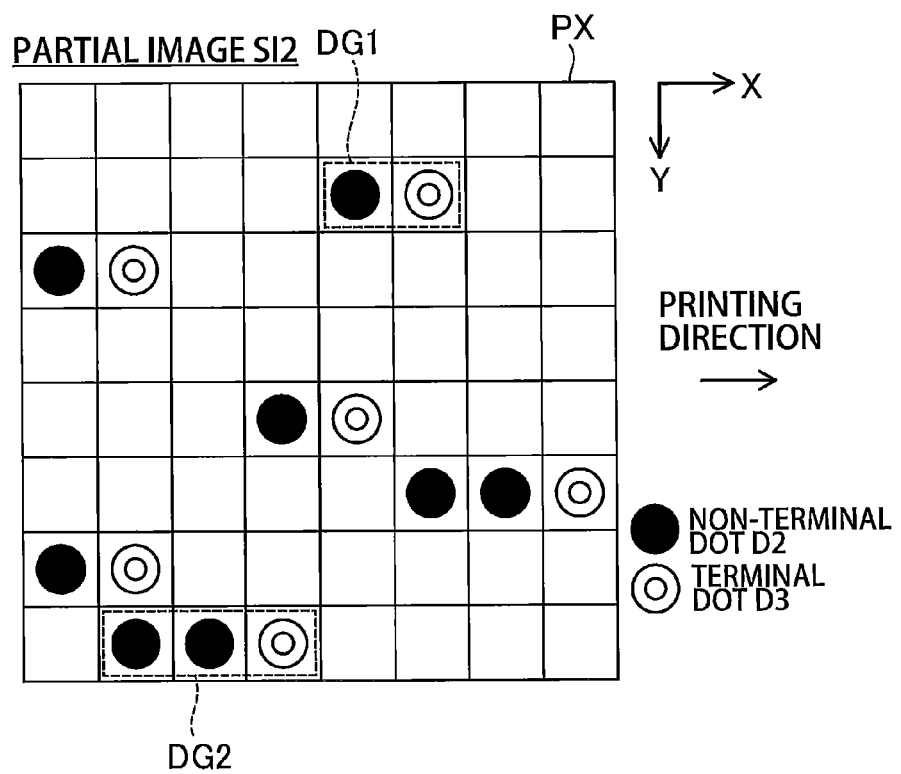
FIG. 7B is an explanatory diagram showing an example of a dot formation pattern within the print image PI.

FIGS. 7A and 7B show examples of dot formation patterns within the print image PI. FIGS. 7A and 7B show partial images SI1 and SI2 corresponding to areas which are contained in the printing data utilized in printing the print image PI, and which are 8 columns of pixels by 8 rows of pixels in size. Dots constituting the partial images SI1 and SI2, along with 64 corresponding pixels PX from within the printing data, are shown in FIGS. 7A and 7B. Dots may be formed at 64 respective locations on the sheet of paper which correspond to 64 respective pixels in the printing data. In other words, each individual dot to be formed according to the printing data is formed at one of the locations on the sheet of paper at which a dot may be formed (also called dot formation locations), in correspondence with respective pixels in the printing data. Here, a dot formed at a dot formation location that is separate from but adjacent to a dot formation location of a particular dot is also called an adjacent dot of the particular dot. In addition, pixels in the printing data which are arrayed in the main scanning direction are called a raster. In FIG. 7A, a single raster RT in the partial image SI is shown. A raster can be said to be a single row of pixels that is parallel to the main scanning direction when printing.

As described above, in the dot data there is only one dot value indicating that a dot is to be formed; namely, "ON". However, the dots in the print image PI can, based on their respective locations relative to other neighboring dots, be classified into three types; namely, isolated dots D1, non-terminal dots D2, and terminal dots D3. The isolated dot is an example of a first dot, the non-terminal dot is an example of a second dot, and the terminal dot is an example of a third dot.

The partial image SI1 in FIG. 7A contains six isolated dots D1. An isolated dot D1 is a dot which has no adjacent dots in the main scanning direction. In other words, an isolated dot D1 is a dot at whose two adjacent dot formation locations in the main scanning direction, i.e. the adjacent dot formation location in the −X direction and the adjacent dot formation location in the +X direction, other dots are not formed.

The partial image SI2 in FIG. 7B contains eight non-terminal dots D2 and six terminal dots D3. Non-terminal dots D2 are dots at particular locations in a dot group which is composed of multiple dots formed in consecutive dot formation locations in the main scanning direction (also referred to below as a consecutive dot group). Specifically, each consecutive dot group has a downstream end location in the printing direction, and non-terminal dots D2 are dots in a consecutive dot group that are at locations other than the downstream end location. In other words, non-terminal dots D2 are dots which, among M dots in a consecutive dot group (where M is a natural number greater than one), are located at positions 1 to (M−1), starting from the upstream end and counting in the downstream direction.

A terminal dot D3 is a dot in a consecutive dot group at a location other than the locations of the non-terminal dots D2. Specifically, a terminal dot D3 is a dot in a consecutive dot group that is located at the downstream end location in the printing direction. In other words, a terminal dot D3 is a dot which is formed last among dots contained in a consecutive dot group.

A consecutive dot group containing M dots contains one terminal dot D3 and (M−1) non-terminal dots D2. For example, in FIG. 7B, a consecutive dot group DG1 contains one terminal dot D3 and one non-terminal dot D2, while a consecutive dot group DG2 contains one terminal dot D3 and two non-terminal dots D2.

Isolated dots D1 and terminal dots D3 are formed using the first unit signal DP1 described with reference to FIG. 4. Non-terminal dots D2 are formed using the second unit signal DP2. That is, viewed from the perspective of the driving signals used for dot formation, the print image PI in the first embodiment can be said to include two types of dots. When outputting the driving signal DS according to the printing data, the head driving circuit 223 (FIG. 2) outputs either the first unit signal DP1 or the second unit signal DP2 for each dot to be formed. Specifically, the head driving circuit 223 references the printing data and determines, for a particular target dot, whether or not an adjacent dot on the downstream side of the target dot in the printing direction is to be formed. If an adjacent dot is to be formed, the head driving circuit 223 outputs the second unit signal DP2 as the unit signal for forming the target dot. If an adjacent dot on the downstream side of the target dot is not to be formed, the head driving circuit 223 outputs the first unit signal DP1 as the unit signal for forming the target dot.

If the signal interval from the end of a unit signal until the beginning of the next unit signal becomes extremely short, the vibration of the pressure chamber RM2 (FIG. 3B) or the ink meniscus resulting from the vibration of the pressure chamber RM2 (FIG. 3B) may become unstable. In such cases, ink ejection may become unstable. The first unit signal DP1 includes the second pulse P2 in order to stabilize the amount of ink that is ejected, and thus an output period Ot1 of the first unit signal DP1 is longer than an output period Ot2 of the second unit signal DP2 (FIG. 4). Consequently, a signal interval st1, which results when a specific period IT in which a unit signal is outputted immediately follows a specific period IT in which the first unit signal DP1 is outputted, is shorter than a signal interval st2, which results when a specific period IT in which a unit signal is outputted immediately follows a specific period IT in which the second unit signal DP2 is outputted (FIG. 4).

For this reason, if a specific period IT in which a unit signal is outputted were to immediately follow a specific period IT in which the first unit signal DP1 is outputted, the signal interval may become extremely short. In particular, if the specific period IT allowed for the formation of a specific dot is relatively short, i.e. if the main scanning speed is relatively high, the signal interval st1 will tend to become short. Consequently, in comparison to using the second unit signal DP2 to form a particular non-terminal dot D2, using the first unit signal DP1 to form the particular non-terminal dot D2 may result in ink ejection becoming more unstable when forming the dot that immediately follows. In light of this, in the present embodiment, the first unit signal DP1 is used only in the formation of isolated dots D1 and terminal dots D3, while second unit signal DP2 is used in the formation of non-terminal dots D2.

A first density which is expressed by isolated dots D1 and terminal dots D3 formed using the first unit signal DP1 differs from a second density which is expressed by non-terminal dots D2 formed using the second unit signal DP2. In the present embodiment, the first density is higher than the second density.

A density value DV1 indicating the first density can be calculated as follows. A first measured value MV1 is first obtained by measuring a density of a first image printed on a sheet of paper using only isolated dots D1, as in the partial image SI1. The density value DV1 indicating the first density is then obtained by dividing the first measured value MV1 by a number C1 of isolated dots D1 contained in the first image per unit area (DV1=MV1/C1).

A density value DV2 indicating the second density can be calculated as follows. A second measured value MV2 is first obtained by measuring a density of a second image printed on a sheet of paper using only consecutive dot groups containing two or more consecutive dots, i.e. a second image that contains only non-terminal dots D2 and terminal dots D3, as in the partial image SI2. By subtracting from the second measured value MV2 the product of a count C3 of the terminal dots D3 contained in the second image per unit area and the density value DV1 indicating the first density (C3×DV1), a density MV22 indicating the portion of the density of the second image that is expressed by the non-terminal dots D2 can be obtained (MV22=MV2−(C3×DV1)). (C3×DV1) is a value indicating the portion of the density of the second image that is expressed by the terminal dots D3. By dividing the obtained density MV22 by a count C2 of the non-terminal dots D2 contained in the second image per unit area, the density value DV2 indicating the second density is obtained (DV2=MV22/C2).

By converting the density value DV1 indicating the first density and the density value DV2 indicating the second density into relative values such that the density value indicating the second density becomes 255, a relative density value A (also referred to below simply as first value A) indicating the first density, and a relative density value B (also referred to below simply as second value B) indicating the second density, are obtained. These two values A and B are stored in a relative density value table and incorporated into the driver program P20, and are utilized in the halftone process in step S30 in FIG. 5 (details are described later). The first value A is an example of a first density value, and the second value B is an example of a second density value.

An overview of the operation of the printing system 1000 in the present embodiment has been presented above. The personal computer 100 in the present embodiment is an example of an image processing apparatus, and the printer 200 is an example of a printing execution unit. In addition, the printing data in the present embodiment is an example of processed image data.

A-3. Halftone Process

FIG. 8 is a flowchart illustrating steps in a halftone process (step S30 in FIG. 5). In addition, an overview of a halftone process is shown in FIG. 1. The target image (not shown) represented by the target image data to be subjected to a halftone process, i.e. the CMYK image data generated by step S3 in the present embodiment, is the same size (in terms of the number of rows and columns of pixels) as the print image PI (FIG. 6) represented by the printing data. Here, a raster in the print image PI, i.e. a row of pixels in the target image corresponding to a row of pixels arrayed in the main scanning direction, is called a target image raster. The halftone process in FIG. 8 is executed on each of the CMYK components. That is, the halftone process in FIG. 8 is executed on the respective component image data contained in the CMYK image data for each of the four components. The component image data is image data consisting of values for one of the four CMYK tone value types (C value, M value, Y value, and K value). A halftone process on one type of component image data, for instance component image data consisting of a K value for each pixel, will be described below.

In step S100, the CPU 110 selects a target raster from among the rasters constituting the target image. Specifically, rasters are selected one at a time in sequence starting from one end in the direction perpendicular to that of the rasters of the target image.

In step S105, the CPU 110 retrieves the printing direction of the target raster. Here, the printing direction of the target raster is the printing direction of the corresponding raster in the printing data. In other words, it can be said that the printing direction of the raster in the target image indicates the order in which dots corresponding to a raster in the target image data are to be formed. In step S110, the CPU 110 sets the processing direction of the target raster to be the direction opposite the printing direction of the target raster (see FIG. 6).

In step S115, the CPU 110 selects a target pixel from among the pixels belonging to the target raster. Specifically, pixels are selected one at a time in sequence from the upstream side toward the downstream side in the processing direction. As a result, it can be said that the processing direction of the raster in the target image indicates the order in which the pixels belonging to the relevant raster are subjected to a halftone process.

In step S120, using a matrix MTX (FIG. 1), as well as error values E1 (described later) calculated based on processed pixels which were target pixels prior to the current target pixel, and which is stored in the error buffer B10 (FIG. 1), the CPU 110 retrieves an error value Et to be added to the target pixel. The matrix MTX allocates weights of greater than zero to pixels located at prescribed relative positions in the vicinity of the target pixel. In the matrix MTX in FIG. 1, a "+" symbol indicates the target pixel, and weights a to m are allocated to neighboring pixels. The sum of the weights a to m e is 1.

In accordance with these weights, the CPU 110 calculates the error value Et to be the weighted sum of the error values E1 of the processed neighboring pixels.

In step S125, the CPU 110 calculates a corrected tone value V1 to be the sum of the error value Et and the tone value of the target pixel (also called the input tone value Vin).

In step S130, the CPU 110 compares the corrected tone value V1 and a threshold value Vth. The threshold value Vth is for example set to 128 if the input tone value Vin takes one of the 256 values from 0 to 255. If the corrected tone value V1 is less than the threshold value Vth (step S130: No), the CPU 110 sets the dot value of the target pixel to a value indicating not to form a dot (also referred to below as "OFF") (step S135). In this case, the CPU 110 sets the relative density value Vb to 0 (step S140).

If the corrected tone value V1 is greater than or equal to the threshold value Vth (step S130: Yes), the CPU 110 sets the dot value of the target pixel to a value indicating to form a dot (also referred to below as "ON") (step S145). In this case, the CPU 110 determines whether or not the dot value of the adjacent pixel processed immediately previously indicates to form a dot, i.e. whether or not the relevant dot value is "ON" (step S150). Here, the adjacent pixel processed immediately previously is the pixel adjacent to the target pixel and upstream thereto in the processing direction. If an adjacent pixel processed immediately previously does not exist, i.e. if the target pixel is the first to be processed among the pixels belonging to the target raster, the dot value of the immediately previous target pixel is deemed to indicate not to form a dot.

If the dot value of the adjacent pixel processed immediately previously indicates to form a dot (step S150: Yes), the CPU 110 sets the relative density value Vb to the second value B (step S160). If the dot value of the adjacent pixel processed immediately previously indicates not to form a dot (step S150: No), the CPU 110 sets the relative density value Vb to the first value A (step S155).

Once the relative density value Vb has been set to the first value A, the second value B, or 0, in step S165 the CPU 110 calculates the error value E1 of the target pixel to be the result of subtracting the relative density value Vb from the corrected tone value V1 (E1=V1−Vb). In step S170, the CPU 110 stores the calculated error value E1 of the target pixel in an address corresponding to the target pixel in the error buffer B10.

In step S175, the CPU 110 determines whether or not processing of the target raster has ended; that is, whether or not all pixels belonging to the target raster have been processed as target pixels. If processing of the target raster has not ended (step S175: No), the CPU 110 returns to step S115, selects an unprocessed pixels as the new target pixel, and repeats the above-described processing from step S120 to step S170.

If processing of the target raster has completed (step S175: Yes), the CPU 110 determines whether or not processing of all rasters in the target image has ended (step S180). If processing of all rasters has not ended (step S180: No), the CPU 100 returns to step S100, selects an unprocessed raster as the new target raster, and repeats the above-described processing from step S105 to step S175. If processing of all of the rasters has ended (step S180: Yes), the CPU 110 ends the halftone process.

Based on the image processing in the first embodiment, as will be described later, for print images printed using the generated printing data, the density of print images containing two types of dots formed using differing unit signals can be appropriately expressed.

FIGS. 9A, 9B, 9C, and 9D show examples of print images for the first embodiment. In FIGS. 9A and 9C, portions of the respective partial images IA1 and IA2 in FIG. 6 are shown conceptually. In FIGS. 9B and 9D, the relative density values Vb for dots in the partial images IA1 and IA2 in FIGS. 9A and 9C are shown. In the halftone process in FIG. 8, the relative density value Vb for a dot signifies the relative density value Vb which, when the pixel corresponding to the dot is processed as the target pixel, is utilized in calculating the error value Et for that target pixel (step S165).

As can be ascertained from FIGS. 9A to 9D, the relative density value Vb for the isolated dots D1 and the terminal dots D3, i.e. the dots formed using the first unit signal DP1, is the first value A. Meanwhile, the relative density value Vb for the non-terminal dots D2, i.e. dots formed using the second unit signal DP2, is the second value B. As a result, even if the density expressed by isolated dots D1 and terminal dots D3 differs from the density expressed by non-terminal dots D2, the density of the print image can be properly expressed.

In addition, in the halftone process, based on whether the dot value for the adjacent pixel processed immediately prior to the target pixel indicates to form a dot or not to form a dot, the CPU 110 determines whether to use the first value A or the second value B as the relative density value Vb (steps S150 to S160 in FIG. 8). Specifically, if the dot value for the adjacent pixel processed immediately prior to the target pixel indicates not to form a dot, the target pixel is deemed to be either an isolated dot D1 or a terminal dot D3, and the first value A is used as the relative density value Vb. If the dot value for the adjacent pixel processed immediately prior to the target pixel indicates not to form a dot, the target pixel is deemed to be a non-terminal dot D3, and the second value B is used as the relative density value Vb. As a result, it is possible to rapidly determine the type of dot to be formed for the target pixel and set the appropriate relative density value Vb, thus enabling the halftone process to be performed more quickly.

In addition, the processing direction of the target raster is set to the opposite of the printing direction of the target raster (step S110). As a result, if a dot to be formed for a target pixel is a terminal dot D3, the type of dot to be formed can be decided appropriately. Specifically, since the printing direction of the partial image IA1 shown in FIG. 9A is the +X direction, terminal dots D3 are located at the end of consecutive dot groups in the +X direction. Consequently, whether a dot to be formed in the partial image IA1 is either a terminal dot D3 or an isolated dot D1, or rather is a non-terminal dot D2, can be ascertained based on whether or not a dot is to be formed in the adjacent pixel on the +X side. In the present embodiment, the processing direction of the rasters in the target image corresponding to the partial image IA1 is set to the −X direction, which is the opposite of the printing direction (the +X direction) of the partial image IA1 (FIGS. 6 and 9A). As a result, the pixel adjacent to the current target pixel on the +X side is selected and subjected to processing in steps S120 to S170 prior to the current target pixel, and thus the dot formation status of the adjacent pixel on the +X side is set prior to that of the current target pixel. Meanwhile, the printing direction of the partial image IA2 shown in FIG. 9C is the −X direction, so the terminal dots D3 are located on the downstream end, in the −X direction, of the consecutive dot groups. Consequently, whether a dot to be formed in the partial image IA2 is either a terminal dot D3 or an isolated dot D1, or rather is a non-terminal dot D2, can be ascertained based on whether or not a dot is to be formed in the adjacent pixel on the −X side. In the present embodiment, the processing direction of the rasters in the target image corresponding to the partial image IA2 is set to the +X direction, which is the opposite of the printing direction (the −X direction) of the partial image IA1 (FIGS. 6 and 9C). As a result, the pixel adjacent to the current target pixel on the −X side is selected and subjected to processing in steps S120 to S170 prior to the current target pixel, and thus the dot formation status of the adjacent pixel on the −X side is set prior to that of the current target pixel. Accordingly, by referencing the dot value set for the adjacent pixel processed immediately previously, the type of dot to be formed for the target pixel can be decided appropriately.

Moreover, if the processing direction of the target raster were to be the same as the printing direction of the target raster, it would not be possible to decide whether the dot to be formed for the target pixel is either a terminal dot D3 or an isolated dot D1, or rather is a non-terminal dot D2, until the pixel immediately after the target pixel is targeted for processing. Consequently, for the relative density value Vb of the dot to be formed for the target pixel to be set, it would be necessary to wait until the dot value of the pixel targeted for processing immediately after the target pixel is set. In the present embodiment, this is not necessary, thus enabling a halftone process to be performed more quickly.

Incidentally, in the current embodiment, only the two values "ON" and "OFF" are employed as dot values, so only one specific value, "ON", indicates that a dot is to be formed. That is, pixels for the three types of dots D1 to D3 all have the same dot value. In this way, despite the fact that dot values indicating dots to be formed in corresponding pixels are set to the same specific value, the relative density values VB for these mutually equal dot values can be two different values A and B. Thus, according to the present embodiment, although the corresponding dot values have the same specific value, the unit signals used to form the dot values are different, so despite containing dots expressing differing densities, this kind of print image can be properly expressed.

B. Second Embodiment

In a second embodiment, the printer 200 executes a halftone process which differs from that in the first embodiment (FIG. 8). Other aspects of the configuration and processing of the second embodiment are equivalent to those of the first embodiment.

FIG. 10 is a flowchart illustrating steps in a halftone process in the second embodiment. When a halftone process starts, the CPU 110 selects a target raster (step S200) and retrieves the printing direction of the target raster (step S205), in the same manner as in steps S100 and S105 in FIG. 8.

Figure 11:
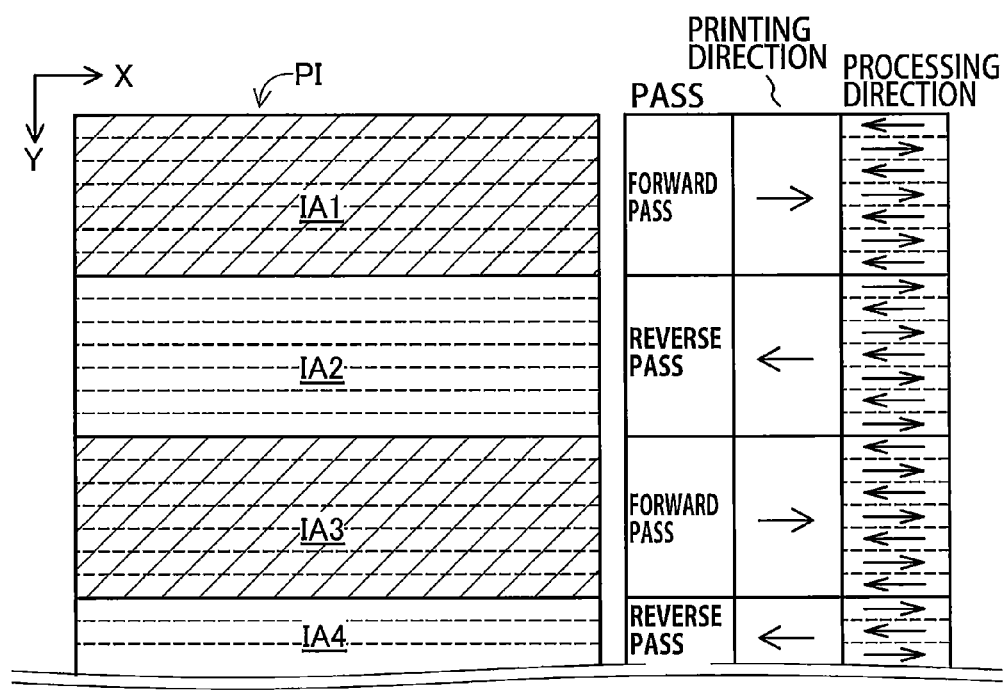
FIG. 11 is an explanatory diagram showing a processing direction for the halftone process according to the second embodiment.

Next, in step S210, the CPU 110 sets the processing direction of the target raster to a predetermined direction. FIG. 11 shows the processing direction for a halftone process. In the present embodiment, counting starting from one end in the direction perpendicular to that of the rasters of the target image, the processing direction of odd-numbered rasters is opposite the processing direction of even-numbered rasters. That is, as rasters are sequentially selected to be target rasters, the processing direction of rasters that are odd-numbered in processing order is set to a first direction parallel to the raster (for example, the +X direction), and the processing direction of rasters that are even-numbered in processing order is set to a second direction parallel to the raster and opposite the first direction (for example, the −X direction). Unlike the first embodiment, the processing direction of the target raster is set independently of the printing direction of the target raster. As a result, the processing direction of the target raster will in some cases be the same as the printing direction of the target raster, and will in some cases be the opposite of the printing direction of the target raster (see FIG. 11).

A benefit of thusly setting the processing direction of the target rasters alternately to opposite directions in the order in which the target rasters are selected is that, compared to for instance always setting the processing direction of the target rasters to the same direction throughout an entire target image or partial image, the image quality of the print image is improved. In the target image, the error values E1 calculated for the respective pixels during a halftone process becomes progressively distributed from the upstream side toward the downstream side in the processing direction. For this reason, if for example the processing direction of the target rasters is always set to the same direction, the error values E1 in the target image become skewed in one direction. As a result, problems such as unevenness may occur in the print image represented by the generated printing data. If the processing direction of the target raster is set alternately to opposite directions in the order in which the target rasters are selected, skewing of the error values E1 can be reduced, and the image quality of the print image can be improved.

In step S215 in FIG. 10, the CPU 110 determines whether or not the processing direction of the target raster is the same as the printing direction of the target raster. If the processing direction of the target raster is not the same as the printing direction of the target raster, i.e. if the processing direction of the target raster is the opposite of the printing direction of the target raster (step S215: No), the CPU 110 executes steps S115 to S175 in FIG. 8 (step S220). In this way, when the processing direction of the target raster is opposite the printing direction of the target raster, dot data can be generated for the target raster using appropriate relative density values Vb in accordance with the dot types, employing the same processing as the halftone process in the first embodiment.

If the processing direction of the target raster is the same as the printing direction of the target raster (step S215: Yes), steps S225 to S290, which partially differ from the halftone process in the first embodiment, are executed.

First, as in steps S115 to S130 in FIG. 8, the CPU 110 selects a target pixel (step S225), uses a matrix to retrieve an error value Et to be added to the target pixel (step S230), calculates the corrected tone value V1 using the error value Et and the input tone value Vin (step S235), and compares the corrected tone value V1 and the threshold value Vth (step S240).

If the corrected tone value V1 is less than the threshold value Vth (step S240: No), the CPU 110 sets the dot value of the target pixel to "OFF" (step S265), and sets the initial density value Vc, which is used when calculating the error value E1 of the target pixel, to 0 (step S270). The CPU then sets the correction value CV, which is used when calculating the error value E1 of the target pixel, to 0 (step S275).

If the corrected tone value V1 is greater than or equal to the threshold value Vth (step S240: Yes), the CPU 110 sets the dot value of the target pixel to "ON" (step S245). The CPU then determines whether or not the dot value of the adjacent pixel processed immediately previously indicates to form a dot, i.e. whether or not the relevant dot value is "ON" (step S255). If an adjacent pixel processed immediately previously does not exist, the dot value of the immediately previous target pixel is deemed to indicate not to form a dot.

If the dot value of the adjacent pixel processed immediately previously indicates to form a dot (step S255: Yes), the CPU 110 sets the correction value CV to the difference between the second value B and the first value A (B−A) (step S260). If the dot value of the adjacent pixel processed immediately previously indicates not to form a dot (step S255: No), the CPU 110 sets the correction value CV to 0 (step S275).

Once the correction value CV has been set to either (B−A) or 0, in step S280, the CPU 110 calculates the error value E1 of the target pixel to be the result of subtracting the initial density value Vc and the correction value CV from the corrected tone value V1 (E1=V1−Vc−CV). Here, taking the relative density value Vb=(Vc+CV), enables E1=(V1−Vb) to be expressed. That is, the relative density value Vb=(Vc+CV) is the value used to indicate the density of the dot to be formed.

For example, if the dot value of the target pixel is set to "ON" (step S245) and the dot value of the adjacent pixel processed immediately previously is "OFF" (step S255: No), Vc=A (step S250) and CV=0 (step S275), thus (Vc+CV)=A. As a result, in this case, the first value A is used as the relative density value Vb.

If the dot value of the target pixel is set to "ON" (step S245) and the dot value of the adjacent pixel processed immediately is "ON" (step S255: Yes), Vc=A (step S250) and CV=(B−A) (step S260), thus (Vc+CV)=B. As a result, in this case, the second value B is used as the relative density value Vb.

If the dot value of the target pixel is set to "OFF" (step S265), Vc=0 (step S270) and CV=0 (step S275), thus (Vc+CV)=0. As a result, in this case, 0 is used as the relative density value Vb.

In step S285, the CPU 110 stores the calculated error value E1 of the target pixel in an address corresponding to the target pixel in the error buffer B10.

In step S290, the CPU 110 determines whether or not processing of the target raster has ended. If processing of the target raster has not ended (step S290: No), the CPU 110 returns to step S225, selects an unprocessed pixel as the new target pixel, and repeats the above-described processing from step S230 to step S285.

If processing of the target raster has completed (step S290: Yes), the CPU 110 determines whether or not processing of all rasters in the target image has ended (step S295). If processing of all rasters has not ended (step S295: No), the CPU 110 returns to step S200, selects an unprocessed raster as the new target raster, and repeats the above-described processing from step S205 to step S290. If processing of all of the rasters has ended (step S295: Yes), the CPU 110 ends the halftone process.

FIGS. 12A, 12B, 12C and 12D show examples of print images for the second embodiment. In FIGS. 12A and 12C, portions of the respective partial images IA1 and IA2 of the print image P1 (FIG. 6) printed using the printing data generated in the second embodiment are shown conceptually. In FIGS. 12B and 12D, the relative density values Vb for respective dots in the partial images IA1 and IA2 in FIGS. 12A and 12C are shown. Relative density value Vb signifies the relative density value Vb utilized in calculating the error value Et for that target pixel when the pixel for the dot is processed as the target pixel (step S280).

The rasters in the print images corresponding to the rasters in the target image for which the printing direction is the opposite of the processing direction, i.e. the first and third rasters from the top of the partial image IA1 in FIG. 12A, and the second and fourth rasters from the top of the partial images IA2 in FIG. 12C, will now described. The dot data for these rasters is generated employing the same processing as that (steps S115 to S175) in the first embodiment. For this reason, as can be ascertained from FIGS. 12A to 12D, as with the first embodiment, the relative density value Vb for the isolated dots D1 and the terminal dots D3, i.e. the dots formed using the first unit signal DP1, is the first value A. Meanwhile, the relative density value Vb for the non-terminal dots D2, i.e. the dots formed using the second unit signal DP2, is the second value B.

The rasters in the print images corresponding to the rasters in the target image for which the printing direction is the same as the processing direction, i.e. the second and fourth rasters from the top of the partial image IA1 in FIG. 12A, and the first and third rasters from the top of the partial image IA2 in FIG. 12C, will now be described. As can be ascertained from FIGS. 12A to 12D, for these rasters, the relative density value Vb for the isolated dots D1, as well as for the dot located at the upstream end, in the processing direction of the halftone process, of the one or more non-terminal dots D2 contained in each consecutive dot group, is the second value B. Meanwhile, the relative density value Vb for the terminal dots D3, as well as for the dots which, among the two or more non-terminal dots D2 contained in each consecutive dot group containing three or more dots, are not located at the upstream end in the processing direction of the halftone process, is the second value B.

As a result, there are cases in which the second value B is utilized as the relative density value Vb for terminal dots D3 formed using the first unit signal DP1, and in which the first value A is utilized as the relative density value Vb for non-terminal dots D2 formed using the second unit signal DP2. Nevertheless, in these cases, of the M dots contained in a consecutive dot group, the first value A is utilized as the relative density value Vb for one non-terminal dot D2, and the second value B is utilized as the relative density value Vb for (M−1) dots, including the terminal dot D3. As a result, the relative density values Vb are set such that the overall density of a consecutive dot group containing M dots is {A+(M−1)× B}. In this way, the M relative density values Vb for the M dots are set such that the overall density of the consecutive dot group containing the M dots is expressed correctly. This is due to the fact that, since the consecutive dot group containing the M dots (where M is a natural number greater than two) contains one terminal dot D3 and (M−1) non-terminal dots D2, the overall density of the consecutive dot group containing the M dots becomes {A+(M−1)×B}.

As can be ascertained from the explanation above, according to the second embodiment, by using either the first value A or the second value B as the value to use as the relative density Vb for dots based on the relative locations of the respective dots, the density of print images containing dots formed using two different unit signals can be appropriately expressed.

Furthermore, with this configuration, a high-speed halftone process can be achieved even when the processing direction of the target raster is the same as the printing direction of the target raster. That is, when the processing direction of the target raster is the same as the printing direction of the target raster, it is difficult to determine whether or not the target pixel is a terminal dot D3, since the dot value of the adjacent pixel located on the downstream side of the target pixel in the processing direction has not been set. When determining whether or not the target pixel is a terminal dot D3, it is necessary to first set the dot value of the adjacent pixel in the processing direction of the target pixel, so a halftone process becomes complicated, could conceivably lead to a decrease in processing speed. Nevertheless, with the present embodiment, if the dot value of the target pixel is "ON", the initial density value Vc is set to the first value A as a provisional relative density value (step S250). That is, the target pixel is, at this point in time, treated as being either an isolated dot D1 or a terminal dot D3. Then, if the dot value of the target pixel is "ON" and, in addition, the dot value of the adjacent pixel processed immediately previously is "ON" (step S255: Yes), the adjacent pixel processed immediately previously is deemed to be a non-terminal dot D2, so the difference between the second value B and the first value A (B−A) is added to the initial density of the current target pixel. As a result, as described above, the M relative density values Vb for the M dots are set such that the overall density of the consecutive dot group containing the M dots is correctly expressed, thus enabling a halftone process to be performed more quickly.

In addition, by enabling a high-speed halftone process to be achieved even when the processing direction of the target raster is the same as the printing direction of the target raster, the processing direction of rasters in the target image can be set independently of the printing direction. As a result, the image quality of the print image can be improved by, for example, setting the processing direction of the odd-numbered rasters in processing order to be the opposite of the even-numbered rasters in processing order, as in the present embodiment.

C. Third Embodiment

C-1. Printing Process Overview

Figure 14A:
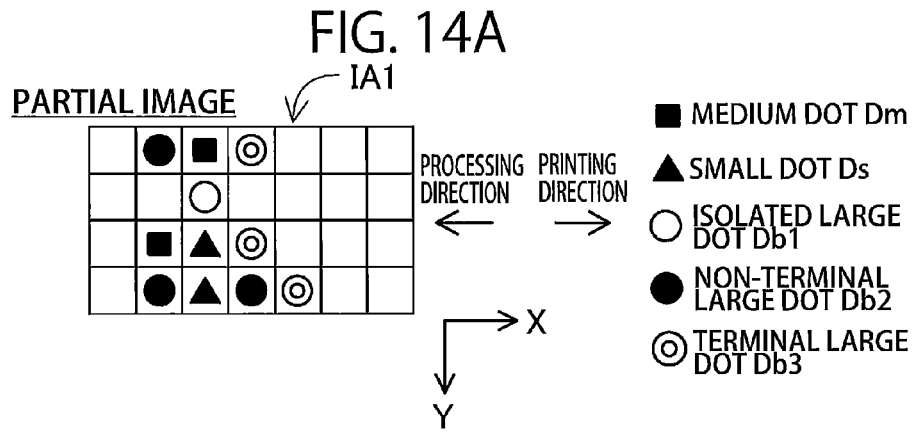
FIG. 14A is an explanatory diagram showing an example of a print image for the third embodiment.
Figure 14B:
FIG. 14B is an explanatory diagram showing an example of the print image for the third embodiment.
Figure 14C:
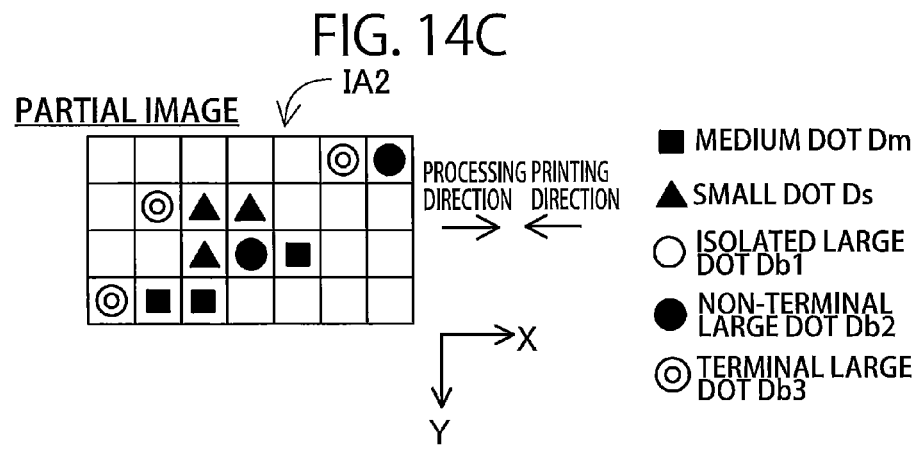
FIG. 14C is an explanatory diagram showing an example of the print image for the third embodiment.

FIG. 13 shows examples of driving signals DS in a third embodiment. FIGS. 14A, 14B, 14C and 14D show examples of print images for the third embodiment. In FIGS. 14A and 14C, portions of the respective partial images IA1 and IA2 of the print image PI (FIG. 6) printed using the printing data generated in the third embodiment are shown conceptually.

In the third embodiment, the printer 200 can execute printing using dots of three sizes; namely, small dots Ds, medium dots Dm which are larger than the small dots D2, and large dots Db which are larger size than the medium dots Dm.

In the present embodiment, four types of unit signals are utilized; namely, the first unit signal DP1 and the second unit signal DP2 described above with reference to FIG. 4, along with a third unit signal DPs and a fourth unit signal DSm (FIG. 13). For example, the driving signal DSs shown in FIG. 13 includes two third unit signals DPs. The driving signal DSm includes two fourth unit signals DPm. As with the unit signals DP1 and DP2, these unit signals DPs and DPm are outputted within the specific period IT.

The third unit signal DPs includes one first pulse P1 and one second pulse P2 outputted after the first pulse P1. The fourth unit signal DPm includes two firsts pulse P1 and one second pulse P2 outputted after the two first pulses P1.

Small dots Ds are formed using the third unit signal DPs, regardless of the location of the respective small dots relative to other neighboring dots. Medium dots Dm are formed using the fourth unit signal DPm, regardless of the location of the respective medium dots relative to other neighboring dots. This is due to the fact that, since the third unit signal DPs and the fourth unit signal DPm have fewer first pulses P1 than does the first unit signal DP1, signal output periods Ots and Otm are short. For this reason, after a specific period IT during which the third unit signal DPs and the fourth unit signal DPm are outputted, even if another unit signal is outputted during the next specific period IT, signal intervals sts and stm will not become extremely short. Accordingly, when forming small dots Ds and medium dots Dm, there is little need to use different unit signals according to the dot formation status of neighboring dots.

As with the dots in the first embodiment, large dots Db are formed utilizing either of two types of terminal signals (the first unit signal DP1 and the second unit signal DP2) depending on the location of the respective large dots Db relative to other neighboring dots. As with the dots in the first embodiment, depending on the dot formation status of neighboring dots, large dots can be classified into three types; namely, isolated large dots Db1, non-terminal large dots Db2, and terminal large dots Db3. An isolated large dot Db1 is a large dot for which there are no dots adjacent thereto in the main scanning direction. A terminal large dot Db3 is a large dot contained in a consecutive dot group and located at the downstream end in the printing direction. A non-terminal large dot Db2 is a large dot contained in a consecutive dot group and not located at the downstream end in the printing direction.

Isolated large dots Db1 and terminal large dots Db3 are formed using the first unit signal DP1 in FIG. 13. Meanwhile, non-terminal large dots Db2 are formed using the second unit signal DP2.

C-2. Halftone Process

Figure 15:
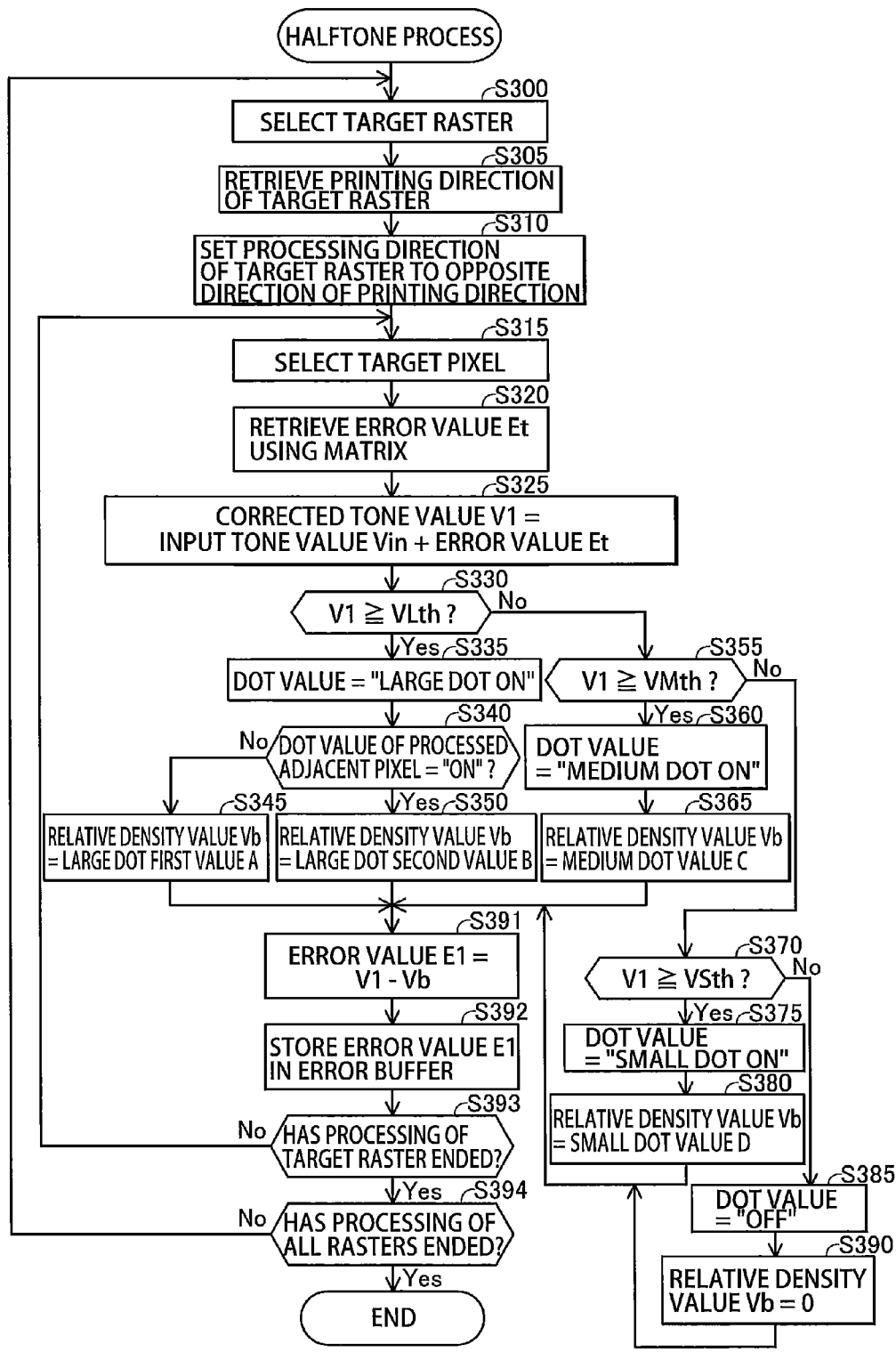
FIG. 15 is a flowchart illustrating steps in a halftone process according to the third embodiment.

FIG. 15 is a flowchart illustrating steps in a halftone process in the third embodiment. In the same manner as in steps S100, S105, and S110 in FIG. 8, when a halftone process starts, the CPU 110 selects a target raster (step S300), retrieves the printing direction of the target raster (step S305), and sets the processing direction to the opposite of the printing direction (step S310).

Then, in the same manner as in steps S115, S120, and S125 in FIG. 8, the CPU 110 selects a target pixel (step S315), uses the matrix MTX (FIG. 1) to retrieve the error value Et to add to the target pixel (step S320), and uses the error value Et and the tone value (also called the input tone value Vin) of the target pixel to calculate the corrected tone value V1 (step S325).

In the next step, step S330, the CPU 110 compares the corrected tone value V1 and a large dot threshold value VLth. If the corrected tone value V1 is less than the large dot threshold value VLth (step S330: No), the corrected tone value V1 is compared to a medium dot threshold value VMth (step S335). If the corrected tone value V1 is greater than or equal to the medium dot threshold value VMth (step S355: Yes), the dot value of the target pixel is set to the value indicating to form a medium dot (also referred to below as "medium dot ON") (step S360), and the relative density value Vb is set to medium dot value C, which indicates the density of middle dots (step S365).

If the corrected tone value V1 is less than the medium dot threshold value VMth (step S355: No), the corrected tone value V1 is compared with a small dot threshold value VSth (step S370). If the corrected tone value V1 is greater than or equal to the small dot threshold value VSth (step S370: Yes), the dot value of the target pixel is set to a value indicating to form a small dot (also referred to below as "small dot ON") (step S375), and the relative density value Vb is set to small dot value D, which is a value indicating the density of small dots (step S380).

If the corrected value V1 is less than the small dot threshold value VSth (step S370: No), the dot value of the target pixel is set to the value indicating not to form a dot (i.e. "OFF") (step S385), and the relative density value Vb is set to 0 (step S390).

Here, if for instance the input tone value Vin were to take 256 tone values from 0 to 255, the three threshold value VLth, VMth, and VSth would respectively be set to 170, 85, and 1.

In step S330, if the corrected tone value V1 is greater than or equal to the large dot threshold value VLth (step S330: Yes), the dot value for the target pixel is set to the value indicating to form a large dot (also referred to below as "large dot ON") (step S335). As can be ascertained from the description above, dot values in the third embodiment are set to one of four values; namely, "large dot ON", "medium dot ON", "small dot ON", and "OFF".

In the next step, step S340, it is determined whether or not the dot value of the adjacent pixel processed immediately previously indicates to form a large, medium, or small dot (step S340). If the dot value of the adjacent image is "large dot ON", "medium dot ON", or "small dot ON", the dot value is deemed to indicate that a dot is to be formed.

If the dot value of the adjacent pixel processed immediately previously indicates to form a dot (step S340: Yes), the CPU 110 sets the relative density value Vb to the large dot second value B (step S350). If the dot value of the adjacent pixel processed immediately previously indicates not to form a dot (step S340: No), the CPU 110 sets the relative density value Vb to the large dot first value A (step S345). For the large dot first value A and the large dot second value B, it is possible to for example utilize the same values as for the first value A and the second value B in the first embodiment; namely, 253 and 255.

Once the relative density value Vb has been set, the corrected tone value V1 and the relative density value Vb are used to calculate the error value E1 (=V1−Vb) of the target pixel (step S391), which is then stored in the error buffer B10 (step S392).

In step S393, it is determined whether or not processing of the target raster has ended. If processing of the target raster has not ended (step S393: No), processing returns to step S315, in which an unprocessed pixel is selected as the new target pixel, and then the above-described steps S320 to S392 are repeated.

If processing of the target raster has completed (step S393: Yes), it is determined whether or not processing of all rasters in the target image has ended (step S394). If processing of all rasters has not ended (step S394: No), processing returns to step S300, in which an unprocessed raster is selected as the new target raster, and then the above-described steps S305 to S393 are repeated. If processing of all of the rasters has ended (step S394: Yes), the halftone process is ended.

Figure 14D:
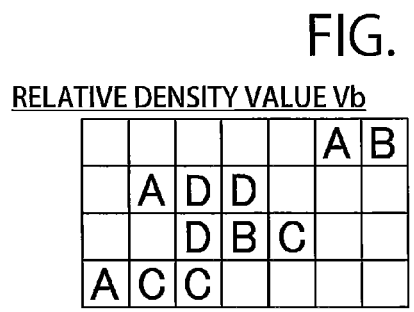
FIG. 14D is an explanatory diagram showing an example of the print image for the third embodiment.

In FIGS. 14A and 14C, portions of the respective partial images IA1 and IA2 of the print image PI printed using the printing data generated in the third embodiment are shown conceptually. In FIGS. 14B and 14D, the relative density values Vb for respective dots in the partial images IA1 and IA2 in FIGS. 14A and 14C are shown.

As can be ascertained from FIGS. 14A to 14D, the medium dot value C is used as the relative density value Vb for medium dots, and the small dot value D is used as the relative density value Vb for small dots. In addition, the large dot first value A is used as the relative density value Vb for isolated large dots Db1 and terminal large dots Db3, i.e. the dots formed using the first unit signal DP1. Meanwhile, the large dot second value B is used as the relative density value Vb for non-terminal dots Db2, i.e. the dots formed using the second unit signal DP2. As a result, even when the density expressed by isolated large dots Db1 and terminal large dots Db3 is different from the density expressed by non-terminal large dots Db2, the density of a print image can be properly expressed.

In this way, according to the image processing in the third embodiment, values representing different densities are used as the relative density value Vb depending on whether the largest of the variously sized dots (specifically, the large dots) are formed using the first unit signal DP1 or are formed using the second unit signal DP2. As a result, the density of a print image containing two types of large dots formed using different unit signals can be appropriately expressed.

According to the image processing in the third embodiment, if the dot value of the target pixel has been set to the specific value ("large dot ON") indicating to form a large dot, the two different values A and B are used as the relative density values Vb indicating the density of large dots. As a result, the density of a print image can be properly expressed.

In addition, according to the image processing in the third embodiment, if the dot value of the target pixel indicates to form a large dot, whether to use the large dot first value A or to use the large dot second value B as the relative density value Vb is set based on whether the dot value of the adjacent pixel processed immediately previously indicates to form a dot or indicates not to form a dot (steps S340 to S350 in FIG. 15). As a result, it is possible to rapidly determine the type of large dot to be formed for the target pixel and set the appropriate relative density value Vb, thus enabling a halftone process to be performed more quickly.

D. Fourth Embodiment

In the fourth embodiment, as in the third embodiment, the printer 200 executes printing using dots of three sizes; namely, large, medium, and small. Further, as in the third embodiment, large dots can be classified into isolated large dots Db1 and terminal large dots Db3 formed using the first unit signal DP1, and non-terminal large dots Db2 formed using the second unit signal DP2. However, the fourth embodiment executes a halftone process which differs from the halftone process in the third embodiment (FIG. 15)

Figure 16:
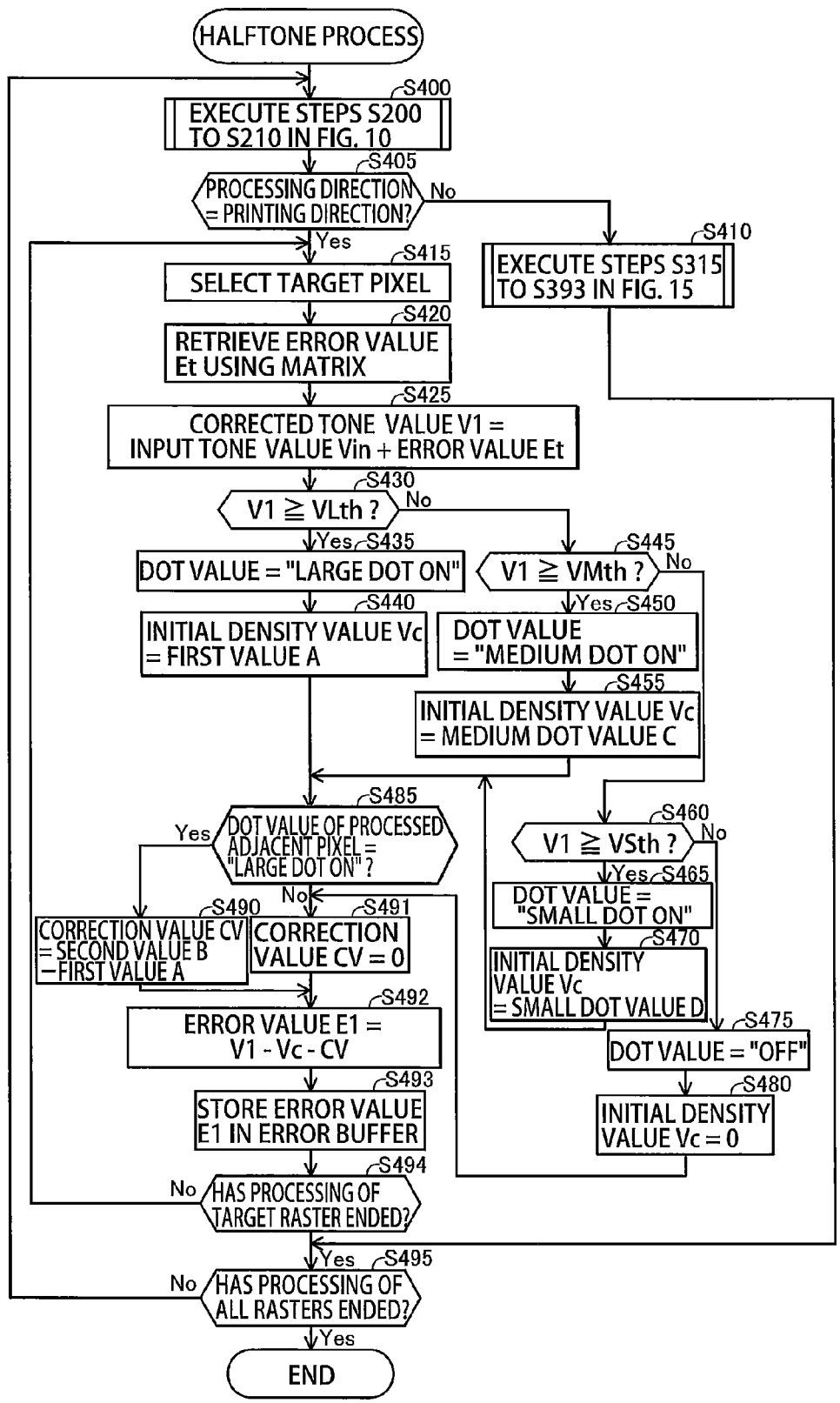
FIG. 16 is a flowchart illustrating steps in a halftone process according to a fourth embodiment.

FIG. 16 is a flowchart illustrating steps in a halftone process in the fourth embodiment. In step S400, the processing from steps S200 to S210 in FIG. 10 is executed. That is, the CPU 110 selects a target raster (FIG. 10, step S200), retrieves the printing direction of the target raster (FIG. 10, step S205), and determines the direction which was predetermined as the processing direction of the target raster (FIG. 10, step S210). Specifically, as in the second embodiment, the processing direction of rasters that are odd-numbered in processing order is set to a first direction parallel to the raster (for example, the +X direction), and the processing direction of rasters that are even-numbered in processing order is set to a second direction parallel to the raster and opposite the first direction (for example, the −X direction) (see FIG. 11).

In step S405, the CPU 110 determines whether or not the processing direction of the target raster is the same as the printing direction of the target raster. If the processing direction of the target raster is not the same as the printing direction of the target raster (step S405: No), the CPU 110 executes steps S315 to S393 in FIG. 15 (step S410). In this way, if the printing direction of the target raster is the opposite of the printing direction of the target raster, dot data for the target raster can, by performing the same halftone process as in the third embodiment, be generated using the appropriate relative density values Vb for the respective types of large dots.

If the processing direction of the target raster is the same as the printing direction of the target raster (step S405: No), processing of steps S415 to S494, which partially differs from the halftone process in the third embodiment, is executed.

First, as in steps S315 to S330 in FIG. 15, the CPU 110 selects a target pixel (step S415), uses a matrix to retrieve an error value Et to be added to the target pixel (step S420), calculates the corrected tone value V1 using the error value Et and the input tone value Vin (step S425), and compares the corrected tone value V1 and the large dot threshold value VLth (step S430).

If the corrected tone value V1 is less than the large dot threshold value VLth (step S430: No), the corrected tone value V1 is compared to the medium dot threshold value VMth (step S445). If the corrected tone value V1 is greater than or equal to the medium dot threshold value VMth (step S445: Yes), the dot value of the target pixel is set to "medium ON" (step S450), and the initial density value Vc is set to medium dot value C (step S455).

If the corrected tone value V1 is less than the medium dot threshold value VMth (step S445: No), the corrected tone value V1 is compared with the small dot threshold value VSth (step S460). If the corrected tone value V1 is greater than or equal to the small dot threshold value VSth (step S460: Yes), the dot value of the target pixel is set to "small dot ON" (step S465), and the initial density value Vc is set to small dot value D (step S470).

If the corrected tone value V1 is less than the small dot threshold value VSth (step S460: No), the dot value of the target pixel is set to "OFF" (step S475), and the initial density value Vc is set to 0 (step S480). In addition, in this case, the CPU 110 sets the correction value CV to 0 (step S491).

In step S430, if the corrected tone value V1 is greater than or equal to the large dot threshold value VLth (step S430: Yes), the CPU 110 sets the dot value for the target pixel to be "large dot ON" (step S435), and sets the initial density value Vc to the large dot first value A (step S440).

In step S485, following step S440, step S455, or step S470, the CPU 110 determines whether or not the dot value of the adjacent pixel processed immediately previously indicates to form a large dot, i.e. whether or not the relevant dot value is "large dot ON". In other words, if it is determined that the dot value of the target pixel indicates to form a large, medium, or small dot, it is then determined whether or not the dot value of the adjacent pixel processed immediately previously indicates to form a large dot.

If the dot value of the adjacent pixel processed immediately previously indicates to form a large dot (step S485: Yes), the CPU 110 sets the correction value CV to the difference between the second value B and the first value A (B−A) (step S490). If the dot value of the adjacent pixel processed immediately previously indicates not to form a large dot (step S485: No), the CPU 110 sets the correction value CV to 0 (step S491).

Once the correction value CV has been set to either (B−A) or 0, in step S492, the CPU 110 calculates the error value E1 of the target pixel using the corrected density value V1, the initial density value Vc, and the correction value CV (E1=V1−Vc−CV). The relative density value Vb=(Vc+CV) is the value used to indicate the density of the dot to be formed.

For example, if the dot value of the target pixel is set to "small dot ON" (step S465) and, in addition, the dot value of the adjacent pixel processed immediately previously is "large dot ON" (step S485: Yes), then Vc=D (step S470) and CV= (B−A) (step S490). Expressing the difference between the second value B and the first value A (B−A) as ΔV results in (Vc+CV)=D+ΔV. Accordingly, in this case the sum of the small dot value D and the difference ΔV is used as the relative density value Vb.

If the dot value of the target pixel is set to "medium dot ON" (step S450) and, in addition, the dot value of the adjacent pixel processed immediately previously is "large dot ON" (step S485: Yes), then Vc=C (step S455) and CV=ΔV (step S490), thus resulting in (Vc+CV)=C+ΔV. Accordingly, in this case, the sum of the medium dot value C and the difference ΔV is used as the relative density value Vb.

If the dot value of the target pixel is set to "large dot ON" (step S435) and, in addition, the dot value of the adjacent pixel processed immediately previously is "large dot ON" (step S485: Yes), then Vc=A (step S440) and CV=ΔV (step S490), thus resulting in (Vc+CV)=A+ΔV=B. Accordingly, in this case, the large dot value second value B is used as the relative density value Vb.

If the dot value of the target pixel is set to "small dot ON" (step S465) and, in addition, the dot value of the adjacent pixel processed immediately previously is "large dot OFF" (step S485: No), then Vc=D (step S470) and CV=0 (step S491). Accordingly, in this case, the small dot value D is used as the relative density value Vb.

If the dot value of the target pixel is set to "medium dot ON" (step S435) and, in addition, the dot value of the adjacent pixel processed immediately previously is "large dot OFF" (step S485: No), then Vc=C (step S455) and CV=0 (step S491). Accordingly, in this case, the medium dot value C is used as the relative density value Vb.

If the dot value of the target pixel is set to "large dot ON" (step S435) and, in addition, the dot value of the adjacent pixel processed immediately previously is "large dot OFF" (step S485: No), then Vc=A (step S440) and CV=0 (step S491). Accordingly, in this case, the large dot first value A is used as the relative density value Vb.

In step S493, the CPU 110 stores the calculated error value E1 of the target pixel in the error buffer B10.

In step S494, it is determined whether or not processing of the target raster has ended. If processing of the target raster has not ended (step S494: No), processing returns to step S415, in which an unprocessed pixel is selected as the new target pixel, and then the above-described steps S420 to S493 are repeated.

If processing of the target raster has completed (step S494: Yes), it is determined whether or not processing of all rasters in the target image has ended (step S495). If processing of all rasters has not ended (step S495: No), processing returns to step S400, in which an unprocessed raster is selected as the new target raster, and then the above-described steps S400 to S494 are repeated. If processing of all of the rasters has ended (step S495: Yes), the halftone process is ended.

Figure 17A:
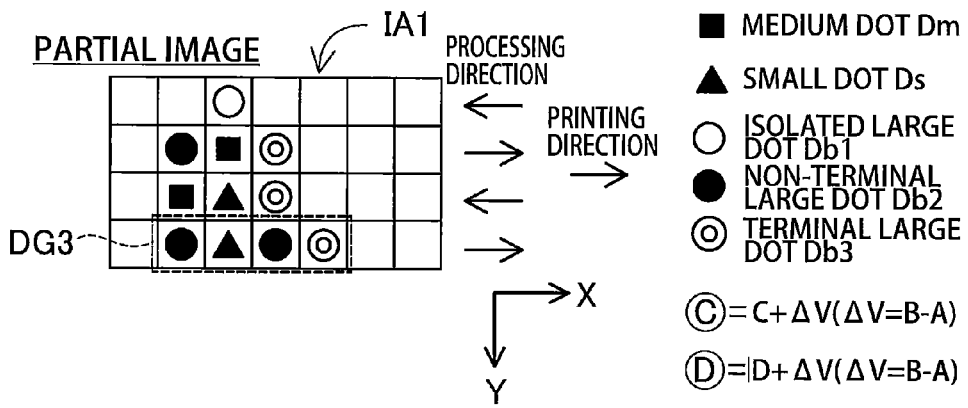
FIG. 17A is an explanatory diagram showing an example of a print image for the fourth embodiment.
Figure 17B:
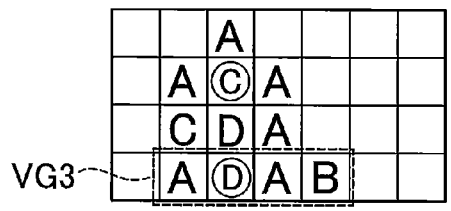
FIG. 17B is an explanatory diagram showing an example of the print image for the fourth embodiment.
Figure 17C:
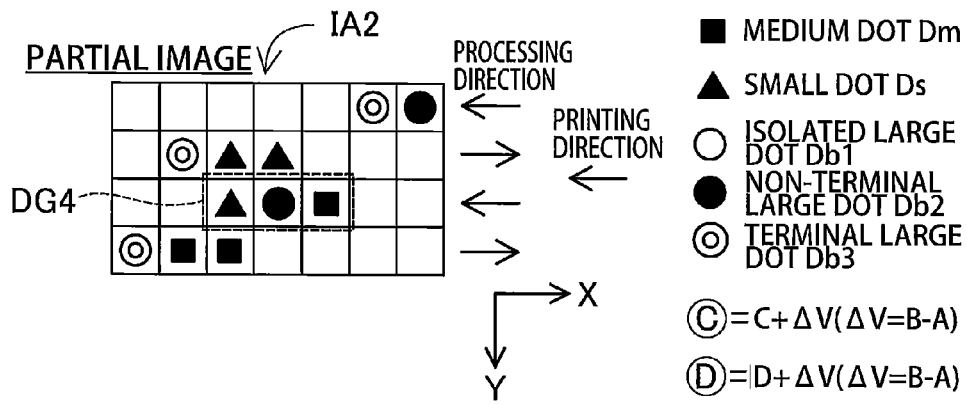
FIG. 17C is an explanatory diagram showing an example of the print image for the fourth embodiment.
Figure 17D:
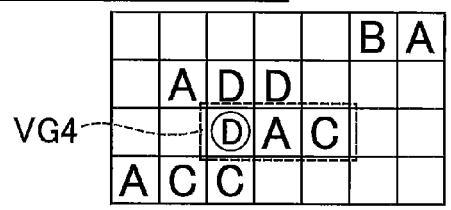
FIG. 17D is an explanatory diagram showing an example of the print image for the fourth embodiment.

FIGS. 17A, 17B, 17C and 17D show examples of print images for the fourth embodiment. In FIGS. 17A and 17C, portions of the respective partial images IA1 and IA2 of the print image PI printed using the printing data generated in the fourth embodiment are shown conceptually. In FIGS. 17B and 17D, the relative density values Vb for respective dots in the partial images IA1 and IA2 in FIGS. 17A and 17C are shown.

The rasters in the print images corresponding to the rasters in the target image for which the printing direction is the opposite of the processing direction, i.e. the first and third rasters from the top of the partial image IA1 in FIG. 17A, and the second and fourth rasters from the top of the partial image IA2 in FIG. 17C, will now be described. The dot data for these rasters is generated employing the same processing as that in the third embodiment (steps S315 to S393 in FIG. 15). For this reason, as can be ascertained from FIGS. 17A to 17D, as with the third embodiment, the relative density value Vb for the isolated large dots Db1 and the terminal large dots Db3, i.e. the dots formed using the first unit signal DP1, is the large dot first value A. Meanwhile, the relative density value Vb for the non-terminal large dots Db2, i.e. the dots formed using the second unit signal DP2, is the large dot second value B. Furthermore, the relative density values Vb for the medium dots and the small dots are the medium dot value C and the small dot value D.

The rasters in the print images corresponding to the rasters in the target image for which the printing direction is the same as the processing direction, i.e. the second and fourth rasters from the top of the partial image IA1 in FIG. 17A, and the first and third rasters from the top of the partial image IA2 in FIG. 17C, will now be described. As can be ascertained from FIGS. 17A to 17D, as with the second embodiment, for these rasters there are cases in which the large dot second value B is used as the relative density value Vb for the terminal large dots Db3 formed using the first unit signal DP1 (e.g. the first line of the partial image IA2 in FIG. 17C). Meanwhile, the large dot first value A is used as the relative density value Vb for the non-terminal large dots Db2 formed using the second unit signal DP2 (e.g. the second and fourth lines of the partial image IA1 in FIG. 17A).

Nevertheless, as with the second embodiment, for a consecutive dot group containing M dots, the M relative density values Vb for the M dots are set such that the overall density of the consecutive dot group is represented correctly. For example, the consecutive dot group DG3 shown in FIG. 17A contains two non-terminal large dots Db2, one terminal large dot Db3, and one small dot Ds. Accordingly, the overall density of the consecutive dot group DG3 is $\{(2 \times B)+A+D\}$. Here, the sum of the set VG3 (FIG. 17(B)) of four relative density values Vb for the four dots contained in the consecutive dot group DG3 is $\{A+D+\Delta V+A+B\}$. Since $\Delta V=(B-A)$, the sum of the set VG3 of four relative density values Vb becomes $\{(2 \times B)+A+D\}$, and thus it can be seen that overall density of the consecutive dot group DG3 is represented correctly.

Likewise, for the consecutive dot group DG4 shown in FIG. 17C contains one non-terminal large dot Db2, one medium dot Dm, and one small dot Ds. Accordingly, the overall density of the consecutive dot group DG4 is $\{B+C+D\}$. Here, the sum of the set VG4 (FIG. 17D) of three relative density values Vb for the three dots contained in the consecutive dot group DG4 is $\{D+\Delta V+A+C\}$. Since $\Delta V=(B-A)$, the sum of the set VG4 of three relative density values VB becomes $\{B+C+D\}$, and thus it can be seen that overall density of the consecutive dot group DG4 is represented correctly.

As can be ascertained from the description above, as with the third embodiment, according to the image processing in the fourth embodiment, the density of print images containing two types of large dots formed using differing unit signals can be appropriately expressed.

In addition, as with the second embodiment, by using the difference between the second value B and the first value A (B−A) to calculate the error value E1 of the target pixel, even for pixels in rasters for which the printing direction is the same as the processing direction, the M relative density values Vb for the M dots in a consecutive dot group are set such that the overall density of the consecutive dot group is correctly expressed, thus enabling a halftone process to be performed more quickly.

E. Variations (1) In the halftone process in the above-described embodiments, color printing using CMYK inks is presented as an example, but a halftone process for monochrome printing using one type of ink is also acceptable.

(2) In the first embodiment, it is acceptable for the isolated dots D1 to be formed using the first unit signal DP1, and for the non-terminal dots D2 and the terminal dots D3 to be formed using the second unit signal DP2. These cases can be facilitated by having the relative density value Vb set to the first value A for the isolated dots D1, and to the second value B for the non-terminal dots D2 and the terminal dots D3.

(3) A variety of printing methods may be utilized as the printing method for the printer 200. For example, the printing mechanism 220 may execute interlaced printing (also called two-pass printing), in which printing of odd-numbered rasters and even-numbered rasters in the printing data are performed in different passes. Moreover, the printing mechanism 220 may execute unidirectional printing using either the forward pass or the reverse pass but not both. Regardless of which printing method is utilized, in the halftone processes in the first embodiment and the third embodiment, it is preferable for the processing direction of the target raster to be set to the opposite of the processing direction of the target raster. Meanwhile, in the halftone processes in the second embodiment and the fourth embodiment, it is preferable for the processing direction of the target raster to be given higher priority than the printing direction appropriate for the printing method, and for the processing direction of the target raster to be set to a predetermined direction.

(4) Image processing in FIG. 5 may be executed by the controller 210 of the printer 200. In this case, for example, image data to be processed is retrieved from the personal computer 100, and printing data generated by the controller 210 is supplied to the printing mechanism 220. In this case, the controller 210 of the printer 200 is an example of an image processing apparatus, and the printing mechanism 220 is an example of a printing execution unit. In addition, it is acceptable for part of the image processing in FIG. 5 to be executed by the personal computer 100, and for the remaining part to be executed by the controller 210 of the printer 200. For example, it is acceptable for the personal computer 100 to generate CMYK image data by executing the steps prior to step S30 in FIG. 5, and for the controller 210 of the printer 200 to receive the CMYK image data from the personal computer 100 and then execute a halftone process (step S30) and printing data generation (step S40).

(5) In the above-described embodiments, part of the configuration executed by hardware may be replaced by software, and conversely, part or all of the configuration executed by software may be replaced by hardware.

While the present invention has been described in detail with reference to the embodiments and variations thereof, the above-described embodiments are presented for the purpose of making the present invention readily understandable, and it would be apparent to those skilled in the art that various changes and modifications may be made therein without departing from the spirit of the invention.

What is claimed is:

1. An image processing apparatus comprising:
    a processor configured to:

perform a halftone process on image data to generate processed image data, the image data including a plurality of tone values of a plurality of pixels, the processed image data including a plurality of dot values of the plurality of pixels, each of the plurality of dot values indicating dot formation status; and supply the processed image data to a printing execution unit, wherein, to perform the halftone process, the processor is further configured to:

calculate a corrected tone value of a target pixel using a tone value of the target pixel and an error value of a previously processed pixel;

determine a dot value of the target pixel by comparing the corrected tone value of the target pixel with a threshold value;

calculate an error value of the target pixel using the corrected tone value of the target pixel and a first density value when the dot value of the target pixel is determined to be a particular value indicating to form a dot and the dot to be formed corresponding to the particular value is a first dot, the first dot being an isolated dot; and calculate an error value of the target pixel using the corrected tone value of the target pixel and a second density value when the dot value of the target pixel is determined to be the same particular value and the dot to be formed corresponding to the particular value is a second dot, the second dot being a dot to be formed at a particular location in consecutive dots.

2. The image processing apparatus according to claim 1, wherein, to perform the halftone process, the processor is further configured to calculate an error value of the target pixel using the corrected tone value of the target pixel and the first density value when the dot value of the target pixel indicates to form a dot and the dot to be formed corresponding to the dot value of the target pixel is a third dot, the third dot being a dot to be formed at a location other than the particular location in the consecutive dots.

3. The image processing apparatus according to claim 2, wherein, to perform the halftone process, the processor is further configured to:

determine whether or not a dot value of a particular adjacent pixel indicates to form a dot when the dot value of the target pixel indicates to form a dot, the particular adjacent pixel being an adjacent pixel processed immediately before the target pixel;

determine that the dot to be formed corresponding to the dot value of the target pixel is one of the first dot and the third dot if the dot value of the particular adjacent pixel indicates not to form a dot; and determine that the dot to be formed corresponding to the dot value of the target pixel is the second dot if the dot value of the particular adjacent pixel indicates to form a dot.

4. The image processing apparatus according to claim 2, wherein the image data includes a first raster, a plurality of pixels belonging to the first raster being subjected to the halftone process in an order arrayed in a processing direction, a plurality of dots corresponding to the plurality of pixels belonging to the first raster being formed in an order arrayed in a forming direction, and the forming direction of the first raster being opposite to the processing direction of the first raster, wherein, to perform the halftone process, the processor is further configured to:

determine whether or not a dot value of a first adjacent pixel belonging to the first raster indicates to form a dot when the dot value of the target pixel belonging to the first raster indicates to form a dot, the first adjacent pixel being an adjacent pixel processed immediately before the target pixel;

determine that the dot to be formed corresponding to the dot value of the target pixel is one of the first dot and the third dot and calculate the error value of the target pixel using the corrected tone value of the target pixel and the first density value if the dot value of the first adjacent pixel indicates not to form a dot; and determine that the dot to be formed corresponding to the dot value of the target pixel is the second dot and calculate the error value of the target pixel using the corrected tone value of the target pixel and the second density value if the dot value of the first adjacent pixel indicates to form a dot.

5. The image processing apparatus according to claim 2, wherein the image data includes a second raster, a plurality of pixels belonging to the second raster being subjected to the halftone process in an order arrayed in a processing direction, a plurality of dots corresponding to the plurality of pixels belonging to the second raster being formed in an order arrayed in a forming direction, and the forming direction of the second raster being same as the processing direction of the second raster, wherein, to perform the halftone process, the processor is further configured to:

determine whether or not a dot value of a second adjacent pixel belonging to the second raster indicates to form a dot when the dot value of the target pixel belonging to the second raster indicates to form a dot, the second adjacent pixel being an adjacent pixel processed immediately before the target pixel;

calculate the error value of the target pixel using the corrected tone value of the target pixel and the first density value if the dot value of the second adjacent pixel indicates not to form a dot; and calculate the error value of the target pixel using the corrected tone value of the target pixel and the second density value if the dot value of the second adjacent pixel indicates to form a dot.

6. The image processing apparatus according to claim 1, wherein the dot value indicating to form a dot is determined to a value among a plurality of values corresponding to a plurality of dot sizes, and wherein, to perform the halftone process, the processor is further configured to:

calculate the error value of the target pixel using the corrected tone value and the first density value when the dot value of the target pixel indicates to form a largest dot having a largest dot size among the plurality of dot sizes and the largest dot to be formed is the first dot; and calculate the error value of the target pixel using the corrected tone value and the second density value when the dot value of the target pixel indicates to form the largest dot and the largest dot to be formed is the second dot.

7. The image processing apparatus according to claim 6, wherein the image data includes a particular raster, a plurality of pixels belonging to the particular raster being subjected to the halftone process in an order arrayed in a processing direction, a plurality of dots corresponding to the plurality of pixels belonging to the first raster being formed in an order arrayed in a forming direction, and the forming direction of the particular raster being same as the processing direction of the particular raster;

wherein, to perform the halftone process, the processor is further configured to:

determine whether or not a dot value of a particular adjacent pixel belonging to the particular raster indicates to form the largest dot when the dot value of the target pixel belonging to the particular raster indicates to form a dot, the particular adjacent pixel being an adjacent pixel processed immediately before the target pixel;

calculate the error value of the target pixel using the corrected tone value of the target pixel and a density value corresponding to the dot value of the target pixel when the dot value of the particular adjacent pixel indicates not to form the largest dot; and calculate the error value of the target pixel using the corrected tone value of the target pixel, a density value corresponding to the dot value of the target pixel and a difference between the first density value and the second density value when the dot value of the particular adjacent pixel indicates to form the largest dot.

8. The image processing apparatus according to claim 1, wherein the first dot is a dot at whose adjacent dot formation locations in a main scanning direction of the printing execution unit no dots are formed; and wherein the second dot is a dot to be formed at a particular location in the consecutive dots arrayed in the main scanning direction.

9. A non-transitory computer readable storage medium storing a set of program instructions executed by a processor, the set of program instructions comprising:

performing a halftone process on image data to generate processed image data, the image data including a plurality of tone values of a plurality of pixels, the processed image data including a plurality of dot values of the plurality of pixels, each of the plurality of dot values indicating dot formation status; and supplying the processed image data to the printing execution unit, wherein the performing of the halftone process comprises:

calculating a corrected tone value of a target pixel using a tone value of the target pixel and an error value of a previously processed pixel;

determining a dot value of the target pixel by comparing the corrected tone value of the target pixel with a threshold value;

calculating an error value of the target pixel using the corrected tone value of the target pixel and a first density value when the dot value of the target pixel is determined to be a particular value indicating to form a dot and a dot to be formed corresponding to the particular value is a first dot, the first dot being an isolated dot; and calculating an error value of the target pixel using the corrected tone value of the target pixel and a second density value when the dot value of the target pixel is determined to be the same particular value and a dot to be formed corresponding to the particular value is a second dot, the second dot being a dot to be formed at a particular location in consecutive dots.

10. An image processing apparatus comprising:

a processor configured to:

perform a halftone process on image data to generate processed image data, the image data including a plurality of tone values of a plurality of pixels, the processed image data including a plurality of dot values of the plurality of pixels, each of the plurality of dot values indicating dot formation status; and supply the processed image data to a printing execution unit, wherein, to perform the halftone process, the processor is further configured to:

calculate a corrected tone value of a target pixel using a tone value of the target pixel and an error value of a previously processed pixel;

determine a dot value of the target pixel by comparing the corrected tone value of the target pixel with a threshold value;

calculate an error value of the target pixel using the corrected tone value of the target pixel and a first density value when the dot value of the target pixel indicates to form a dot and the dot to be formed corresponding to the dot value of the target pixel is a first dot, the first dot being an isolated dot; and calculate an error value of the target pixel using the corrected tone value of the target pixel and a second density value when the dot value of the target pixel indicates to form a dot and the dot to be formed corresponding to the dot value of the target pixel is a second dot, the second dot being a dot to be formed at a particular location in consecutive dots;

wherein the first dot is a dot at whose adjacent dot formation locations in a main scanning direction of the printing execution unit no dots are formed; and wherein the second dot is a dot to be formed at a particular location in the consecutive dots arrayed in the main scanning direction.

11. The image processing apparatus according to claim 10, wherein, to perform the halftone process, the processor is further configured to calculate an error value of the target pixel using the corrected tone value of the target pixel and the first density value when the dot value of the target pixel indicates to form a dot and the dot to be formed corresponding to the dot value of the target pixel is a third dot, the third dot being a dot to be formed at a location other than the particular location in the consecutive dots.

12. The image processing apparatus according to claim 11, wherein, to perform the halftone process, the processor is further configured to:

determine whether or not a dot value of a particular adjacent pixel indicates to form a dot when the dot value of the target pixel indicates to form a dot, the particular adjacent pixel being an adjacent pixel processed immediately before the target pixel;

determine that the dot to be formed corresponding to the dot value of the target pixel is one of the first dot and the third dot if the dot value of the particular adjacent pixel indicates not to form a dot; and determine that the dot to be formed corresponding to the dot value of the target pixel is the second dot if the dot value of the particular adjacent pixel indicates to form a dot.

13. The image processing apparatus according to claim 11, wherein the image data includes a first raster, a plurality of pixels belonging to the first raster being subjected to the halftone process in an order arrayed in a processing direction, a plurality of dots corresponding to the plurality of pixels belonging to the first raster being formed in an order arrayed in a forming direction, and the forming direction of the first raster being opposite to the processing direction of the first raster, wherein, to perform the halftone process, the processor is further configured to:
  determine whether or not a dot value of a first adjacent pixel belonging to the first raster indicates to form a dot when the dot value of the target pixel belonging to the first raster indicates to form a dot, the first adjacent pixel being an adjacent pixel processed immediately before the target pixel;
  determine that the dot to be formed corresponding to the dot value of the target pixel is one of the first dot and the third dot and calculate the error value of the target pixel using the corrected tone value of the target pixel and the first density value if the dot value of the first adjacent pixel indicates not to form a dot; and
  determine that the dot to be formed corresponding to the dot value of the target pixel is the second dot and calculate the error value of the target pixel using the corrected tone value of the target pixel and the second density value if the dot value of the first adjacent pixel indicates to form a dot.

14. The image processing apparatus according to claim 11, wherein the image data includes a second raster, a plurality of pixels belonging to the second raster being subjected to the halftone process in an order arrayed in a processing direction, a plurality of dots corresponding to the plurality of pixels belonging to the second raster being formed in an order arrayed in a forming direction, and the forming direction of the second raster being same as the processing direction of the second raster, wherein, to perform the halftone process, the processor is further configured to:
  determine whether or not a dot value of a second adjacent pixel belonging to the second raster indicates to form a dot when the dot value of the target pixel belonging to the second raster indicates to form a dot, the second adjacent pixel being an adjacent pixel processed immediately before the target pixel;
  calculate the error value of the target pixel using the corrected tone value of the target pixel and the first density value if the dot value of the second adjacent pixel indicates not to form a dot; and
  calculate the error value of the target pixel using the corrected tone value of the target pixel and the second density value if the dot value of the second adjacent pixel indicates to form a dot.

15. The image processing apparatus according to claim 10, wherein the dot value indicating to form a dot is determined to a value among a plurality of values corresponding to a plurality of dot sizes, and
  wherein, to perform the halftone process, the processor is further configured to:
  calculate the error value of the target pixel using the corrected tone value and the first density value when the dot value of the target pixel indicates to form a largest dot having a largest dot size among the plurality of dot sizes and the largest dot to be formed is the first dot; and
  calculate the error value of the target pixel using the corrected tone value and the second density value when the dot value of the target pixel indicates to form the largest dot and the largest dot to be formed is the second dot.

16. The image processing apparatus according to claim 15, wherein the image data includes a particular raster, a plurality of pixels belonging to the particular raster being subjected to the halftone process in an order arrayed in a processing direction, a plurality of dots corresponding to the plurality of pixels belonging to the first raster being formed in an order arrayed in a forming direction, and the forming direction of the particular raster being same as the processing direction of the particular raster;
  wherein, to perform the halftone process, the processor is further configured to:
  determine whether or not a dot value of a particular adjacent pixel belonging to the particular raster indicates to form the largest dot when the dot value of the target pixel belonging to the particular raster indicates to form a dot, the particular adjacent pixel being an adjacent pixel processed immediately before the target pixel;
  calculate the error value of the target pixel using the corrected tone value of the target pixel and a density value corresponding to the dot value of the target pixel when the dot value of the particular adjacent pixel indicates not to form the largest dot; and
  calculate the error value of the target pixel using the corrected tone value of the target pixel, a density value corresponding to the dot value of the target pixel and a difference between the first density value and the second density value when the dot value of the particular adjacent pixel indicates to form the largest dot.

17. A non-transitory computer readable storage medium storing a set of program instructions executed by a processor, the set of program instructions comprising:
  performing a halftone process on image data to generate processed image data, the image data including a plurality of tone values of a plurality of pixels, the processed image data including a plurality of dot values of the plurality of pixels, each of the plurality of dot values indicating dot formation status; and
  supplying the processed image data to the printing execution unit,
  wherein the performing of the halftone process comprises:
    calculating a corrected tone value of a target pixel using a tone value of the target pixel and an error value of a previously processed pixel;
    determining a dot value of the target pixel by comparing the corrected tone value of the target pixel with a threshold value;
    calculating an error value of the target pixel using the corrected tone value of the target pixel and a first density value when the dot value of the target pixel indicates to form a dot and a dot to be formed corresponding to the dot value of the target pixel is a first dot, the first dot being an isolated dot; and
    calculating an error value of the target pixel using the corrected tone value of the target pixel and a second density value when the dot value of the target pixel indicates to form a dot and a dot to be formed corresponding to the dot value of the target pixel is a second dot, the second dot being a dot to be formed at a particular location in consecutive dots;
  wherein the first dot is a dot at whose adjacent dot formation locations in a main scanning direction of the printing execution unit no dots are formed; and
  wherein the second dot is a dot to be formed at a particular location in the consecutive dots arrayed in the main scanning direction.

\* \* \* \* \*